(12) United States Patent
Sakurai et al.

(10) Patent No.: US 6,777,102 B2
(45) Date of Patent: Aug. 17, 2004

(54) CURABLE COMPOSITION AND HARDCOATED ARTICLE EMPLOYING SAME

(75) Inventors: Seiya Sakurai, Minamiashigara (JP); Yuuzou Muramatsu, Kaisei-machi (JP); Akihiro Matsufuji, Odawara (JP); Kenichirou Hatayama, Yokosuka (JP)

(73) Assignee: Fuji Photo Film Co., Ltd., Minamiashigara (JP)

( * ) Notice: Subject to any disclaimer, the term of this patent is extended or adjusted under 35 U.S.C. 154(b) by 0 days.

(21) Appl. No.: 10/079,566

(22) Filed: Feb. 22, 2002

(65) Prior Publication Data
US 2003/0004221 A1 Jan. 2, 2003

(30) Foreign Application Priority Data

Feb. 23, 2001 (JP) ........................... 2001-048555
Mar. 16, 2001 (JP) ........................... 2001-076391
Feb. 5, 2002 (JP) ........................... 2002-027610

(51) Int. Cl.$^7$ ............................................. B32B 27/30
(52) U.S. Cl. ..................... 428/521; 428/522; 428/413
(58) Field of Search ........................ 428/521, 522, 428/413, 220, 423.1, 500, 523

(56) References Cited

U.S. PATENT DOCUMENTS

| | | | |
|---|---|---|---|
| 4,427,823 A | | 1/1984 | Inagaki et al. |
| 4,624,971 A | | 11/1986 | van Tao et al. |
| 5,174,848 A | * | 12/1992 | Yazaki et al. ............... 156/242 |
| 5,252,694 A | * | 10/1993 | Willett et al. ................. 522/13 |
| 5,783,049 A | * | 7/1998 | Bright et al. .......... 204/192.14 |
| 6,358,601 B1 | * | 3/2002 | Bilkadi ....................... 428/323 |

FOREIGN PATENT DOCUMENTS

| | | |
|---|---|---|
| JP | 62-21815 B2 | 5/1987 |
| JP | 2-60696 B2 | 12/1990 |
| JP | 8-73771 A | 3/1996 |
| JP | 2000-52472 A | 2/2000 |
| JP | 2000-71392 A | 3/2000 |

* cited by examiner

*Primary Examiner*—James J. Seidleck
*Assistant Examiner*—Melanie Bissett
(74) *Attorney, Agent, or Firm*—Burns, Doane, Swecker & Mathis, L.L.P.

(57) ABSTRACT

A curable composition that is curable by polymerizing both a group capable of ring-opening polymerization and an ethylenically unsaturated group includes a cross-linkable polymer containing a repeating unit represented by the formula below, the group capable of ring-opening polymerization being present in a side chain of the polymer. A hardcoated article is formed by curing the curable composition. Its hardcoat layer has a pencil hardness of 4H to 9H. A hardcoated film is formed by coating on a plastic film the curable composition and curing it. The hardcoated film is used, for example, to laminate the front face of an image display device.

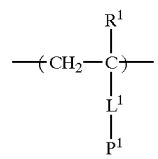

In the formula, $R^1$ denotes hydrogen or an alkyl group having 1 to 4 carbon atoms, $P^1$ is a monovalent group containing a group capable of ring-opening polymerization, and $L^1$ is a single bond or a divalent linking group.

9 Claims, 1 Drawing Sheet

CURABLE COMPOSITION AND HARDCOATED ARTICLE EMPLOYING SAME

BACKGROUND OF THE INVENTION

1. Field of the Invention

The present invention relates to a curable composition that can provide a cured material having high hardness and a low level of cure shrinkage. The present invention also relates to a hardcoated article having a cured resin layer that is obtained by coating the above-mentioned curable composition on a substrate and curing it. More particularly, the present invention relates to a hardcoated article that has a low occurrence of coating peel-off and cracks, and has excellent abrasion resistance and surface hardness. Furthermore, the present invention relates to a hardcoated film that has a low occurrence of coating peel-off and cracks, is less curled after curing, and has excellent abrasion resistance and surface hardness.

2. Description of the Related Art

In recent years, plastic products have been superseding glass products because of ease of processing and reduction in weight. Since the surface of a plastic product is susceptible to damage, in many cases a hardcoat layer is formed directly thereon by coating a curable resin, or a hardcoat layered plastic film (called a "hardcoated film") is laminated thereon with the aim of imparting abrasion resistance to the surface. Conventional glass products are also increasingly laminated with a plastic film in order to prevent scattering, and forming a hardcoat layer on the surface of such a film is useful and widely carried out so as to increase the hardness of the surface.

As conventional hardcoat materials, thermosetting coating materials and UV curable coating materials are used. However, for the purpose of obtaining hardcoated films, which are produced by coating the materials on plastic films and curing them, since the heat resistance of plastic films is poor, the UV curable coating materials, which can be cured at low temperature, are widely used. In general, curable components used in the UV curable coating materials are compounds called polyfunctional acrylate monomers, which have 2 to 6 acrylate ester groups in the molecule, and oligomers called urethane acrylates, polyester acrylates or epoxy acrylates, which have a molecular weight of a few hundred to a few thousand and several acrylate ester groups in the molecule. However, since most of the above-mentioned oligomers have a low acrylic group content and cannot achieve sufficient hardness by themselves, the polyfunctional acrylate monomers are widely used as hardcoat materials to give the required higher degree of hardness.

Generally, the hardcoated films are produced by coating the above-mentioned hardcoat materials as a thin coating of the order of 3 to 10 $\mu$m on a plastic film, either directly or via a ca. 1 $\mu$m primer layer. However, in conventional hardcoated films, since the hardness of the hardcoat layer is insufficient and the coating thickness thereof is low, when the base plastic substrate film deforms, the hardcoat layer deforms accordingly. The hardness of the entire hardcoated film is thus low and is not completely satisfactory. For example, a hardcoated film obtained by coating a UV curable coating material at the above-mentioned thickness on a cellulose triacetate or polyethylene terephthalate film, which are widely used as plastic substrate films, generally has a pencil hardness level of 2H to 3H, which falls far short of the pencil hardness of glass of 9H.

In order to compensate for the inadequate hardness, simply increasing the thickness of the hardcoat layer from the usual range of 3–10 $\mu$m can improve the hardness of the hardcoated film. However, this causes the problems that the hardcoat layer so obtained easily cracks while at the same time the volume shrinkage during curing results in degradation of the adhesion to the substrate, thereby causing peel-off, and there is increased curling of the hardcoated film. It has therefore been difficult in the art to obtain a hardcoated film that has good characteristics and can be put into actual use.

JP-B-02-60696 (JP-B denotes Japanese examined patent application publication) (and the corresponding U.S. Pat. No. 4,427,823) discloses a coating composition containing a polyfunctional acrylate monomer as a resin-forming component for the hardcoat layer, and further containing a powdered inorganic filler such as alumina, silica or titanium oxide, and a polymerization initiator. JP-B-62-21815 (and the corresponding U.S. Pat. No. 4,624,971) discloses a photopolymerizable composition containing an inorganic filler made of silica or alumina whose surface has been treated with an alkoxysilane, etc. JP-A-2000-52472 (JP-A denotes Japanese unexamined patent application publication) proposes a method in which the hardcoat layer is formed from two layers, and adding particulate silica to the first layer improves curl and abrasion resistance. As described in these publications, the addition of inorganic particles improves the hardness of the hardcoat layers and suppresses the level of cure shrinkage, but does not satisfy the recent requirements for the hardcoat surface hardness.

JP-A-8-73771 discloses a photocurable hardcoat composition that is a mixture comprising a compound having at least 3 radically polymerizable groups in the molecule and a cationically polymerizable compound having 1 to 5 epoxy groups in the molecule. In an embodiment of this publication, although the cure shrinkage can be suppressed to some extent, a sufficient hardness cannot be obtained; increasing the coating thickness in order to enhance the surface hardness results in a high level of curl in the hardcoated film, and requirements in terms of the hardness and cure shrinkage are not satisfied.

JP-A-2000-71392 discloses a hardcoated film in which the hardcoat layer is formed from two layers, the lower layer being a cured resin layer formed from a blend of a radically curable resin and a cationically curable resin, and the upper layer being a cured resin layer formed from a radically curable resin alone. This publication describes setting the elasticity of the lower layer lower than that of the upper layer so that an applied stress can be absorbed by deformation of the hardcoat layer. In an example thereof the use of a monofunctional or bifunctional cationically curable compound in the lower layer actually suppressed the occurrence of coating peel-off, cracks and curling and achieved a pencil hardness of 4H. However, although such an arrangement can suppress the occurrence of coating peel-off and scratches on the coating, which are defined as damage in JIS K5400, the coating is very easily dented. Attempting to increase the hardness or the coating thickness of the upper layer in order to improve the denting generates cracks on the edge of the film when it is cut, and the recent requirements for the hardcoat surface hardness are not satisfied.

As a result of an intensive investigation by the present inventors, it has been found that the use of a specified compound in a curable composition can give a cured product that has high hardness and low cure shrinkage. It has also been found that by coating the curable composition on a substrate a hardcoated article can be obtained that is resistant to coating peel-off and cracks after curing, and has sufficient hardness. Furthermore, it has been found that, even when a plastic film is used as a substrate, a hardcoated film can be obtained that has less curl caused by cure shrinkage and has sufficient hardness.

BRIEF SUMMARY OF THE INVENTION

The present invention has been carried out in view of the above-mentioned circumstances.

It is an object of the present invention to provide a curable composition that can give a cured material having high hardness and low cure shrinkage. It is another object of the present invention to provide a hardcoated article that is resistant to coating peel-off and cracks and has sufficient hardness. It is yet another object of the present invention to provide a hardcoated film which, even in the case where a plastic film substrate is used, is resistant to coating peel-off and cracks, avoids the problem of curl caused by cure shrinkage, and has sufficient hardness.

A first aspect of the present invention relates to a curable composition which is curable by polymerizing both a group capable of ring-opening polymerization and an ethylenically unsaturated group, wherein the group capable of ring-opening polymerization is present in a side chain of a cross-linkable polymer containing a repeating unit represented by formula (1) below.

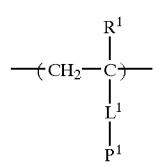

Formula (1)

In the formula, $R^1$ denotes hydrogen or an alkyl group having 1 to 4 carbon atoms, $P^1$ is a monovalent group containing a group capable of ring-opening polymerization, and $L^1$ is a single bond or a divalent linking group.

A second aspect of the present invention relates to a hardcoated article employing a curable composition which has been cured by polymerizing both a group capable of ring-opening polymerization and an ethylenically unsaturated group, wherein the group capable of ring-opening polymerization is present in a side chain of a cross-linkable polymer containing a repeating unit represented by the above-mentioned formula (1).

A third aspect of the present invention relates to an image display device equipped with a hardcoated film, the hardcoated film corresponding to the above-mentioned hardcoated article where a plastic film is used as the substrate.

The above-mentioned objects, other objects, features, and advantages of the invention will become clear from the following description.

DETAILED DESCRIPTION OF THE INVENTION

Figure 1:
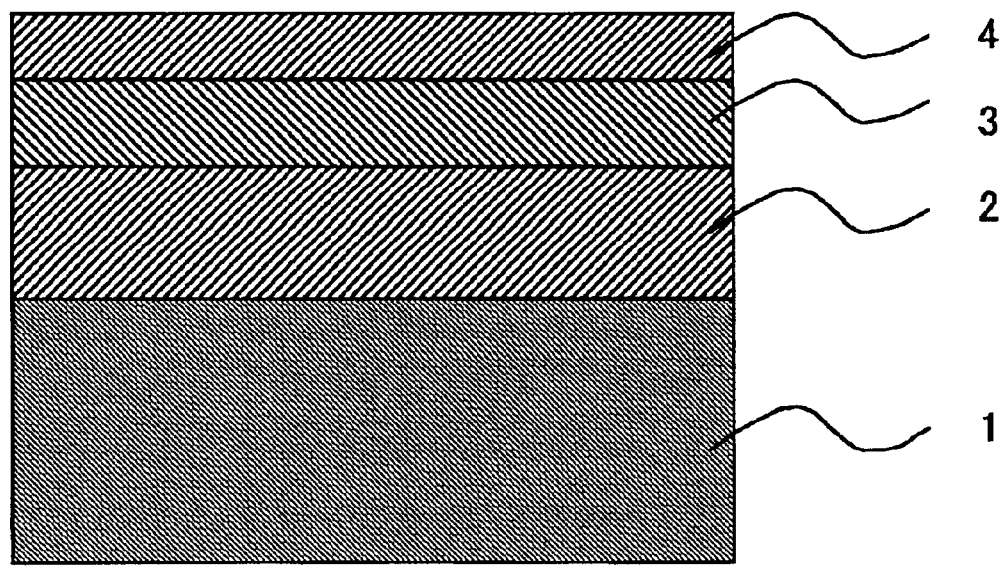
FIG. 1 is a cross section schematic diagram showing a basic layer structure of an antireflection hard coat film of one embodiment of the present invention, wherein a hard coat layer is provided on a support.

Preferred embodiments of the present invention are outlined below.

In one embodiment of the curable composition and the hardcoated article of the present invention, a compound having at least two ethylenically unsaturated groups in the molecule is used in combination with the cross-linkable polymer represented by the above-mentioned formula (1). One preferable example of the compound having ethylenically unsaturated groups is a polyfunctional acrylate having at least three acryloyl groups in the molecule and an acryloyl equivalent weight of 120 or below.

In another embodiment of the curable composition and the hardcoated article of the present invention, a cross-linkable polymer containing a repeating unit represented by formula (2) is used as the compound having at least two ethylenically unsaturated groups in the molecule. This cross-linkable polymer may be a cross-linkable copolymer containing a non-cross-linkable repeating unit.

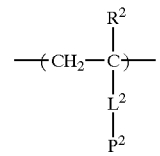

Formula (2)

In formula (2), $R^2$ denotes hydrogen or a $C_1$ to $C_4$ alkyl group, and preferably hydrogen or methyl. $P^2$ is a monovalent group containing an ethylenically unsaturated group, and $L^2$ is a single bond or a divalent linking group, and preferably a single bond, —O—, an alkylene group, an arylene group, *—COO—, *—CONH—, *—OCO— or *—NHCO— (which are connected to the main chain on the side denoted by *). Preferable examples of $P^2$ include monovalent groups containing an acryloyl group, a methacryloyl group, or a styryl group and, most preferably, a monovalent group containing an acryloyl group.

In yet another embodiment of the curable composition and the hardcoated article of the present invention, a cross-linkable polymer containing both a repeating unit represented by the above-mentioned formula (1) and a repeating unit represented by the above-mentioned formula (2) is used. This cross-linkable polymer may be a cross-linkable copolymer containing an additional repeating unit.

In the curable composition and the hardcoated article of the present invention, the group capable of ring-opening polymerization is preferably a cationically polymerizable group, and most preferably an epoxy group.

The ethylenically unsaturated group is preferably an acryloyl group or a methacryloyl group, and most preferably an acryloyl group.

With regard to the method for curing the curable composition of the present invention, it is preferable to employ a method in which curing is carried out utilizing activation energy radiation (also commonly known as 'radiation curing'), and most preferably a method in which a light-sensitive cationic polymerization initiator and a light-sensitive radical polymerization initiator are both added to the curable composition, and it is irradiated with ultraviolet light.

The curable composition of the present invention refers to a composition containing both a cross-linkable polymer containing a repeating unit represented by formula (1) and a compound containing at least two ethylenically unsaturated groups in the molecule, and to a composition containing a cross-linkable polymer containing both a repeating unit represented by formula (1) and a repeating unit represented by formula (2). The hardcoated article of the present invention has a hardcoat layer that is formed by coating the curable composition of the present invention on a substrate and curing it. The hardcoat layer may be a single layer or may be formed from a plurality of layers, but it is preferably a single layer in terms of ease of production. The single layer referred to here denotes a hardcoat layer formed from a single composition, and the layer can be formed by coating the composition a plurality of times as long as the compositions after coating and drying (together called 'forming by coating') are the same. The plurality of layers referred to here means that the layers are formed from a plurality of compositions having different compositional makeups, and in the present invention it is necessary for at least one layer to be the hardcoat layer formed by coating the curable composition of the present invention and curing it. In this case, it is particularly preferable that the outermost layer is the hardcoat layer formed by coating the curable composition of the present invention and curing it.

The cross-linkable polymer containing a repeating unit represented by formula (1) is explained in detail below. In formula (1), $R^1$ denotes hydrogen or a $C_1$ to $C_4$ alkyl group, and preferably hydrogen or methyl. $L^1$ denotes a single bond or a divalent linking group, and preferably a single bond, —O—, an alkylene group, an arylene group, *—COO—, *—CONH—, *—OCO— or *—NHCO— (which are connected to the main chain on the side denoted by *). $P^1$ is a monovalent group containing a group capable of ring-opening polymerization. The term 'monovalent group containing a group capable of ring-opening polymerization' denotes a monovalent group having a cyclic structure that can undergo a ring-opening polymerization by the action of a cation, an anion, a radical, etc., and among these, cationic ring-opening polymerization of a heterocyclic compound is preferred. Preferable examples of $P^1$ include monovalent groups containing an epoxy ring, an oxetane ring, a tetrahydrofuran ring, a lactone ring, a carbonate ring, an iminoether ring such as an oxazoline ring, etc., particularly preferably monovalent groups containing an epoxy ring, an oxetane ring, or an oxazoline ring, and most preferably a monovalent group containing an epoxy ring.

The cross-linkable polymer containing a repeating unit represented by formula (1) of the present invention is preferably synthesized by simple polymerization of its corresponding monomer. The polymerization in this case is preferably radical polymerization since it is the most simple method.

Specific preferable examples of the repeating unit represented by formula (1) are illustrated below, but the present invention is in no way limited thereby.

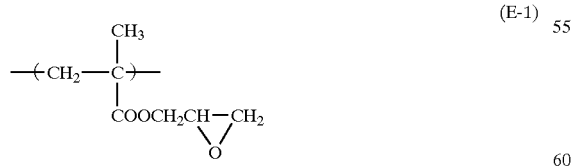

(E-1)

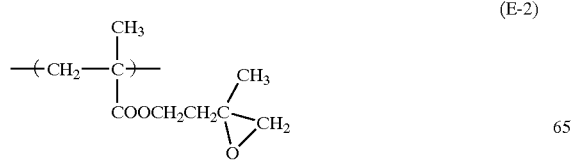

(E-2)

-continued

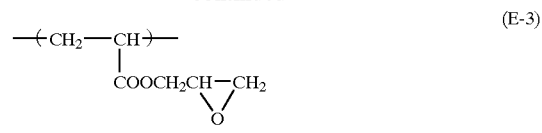

(E-3)

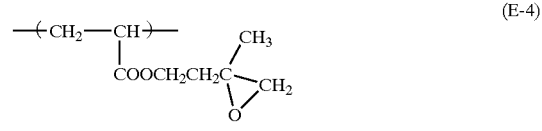

(E-4)

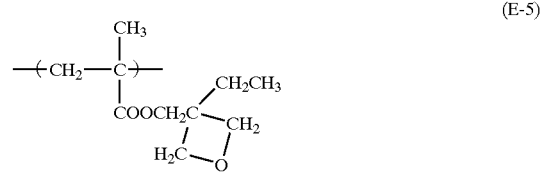

(E-5)

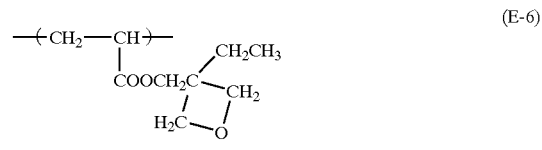

(E-6)

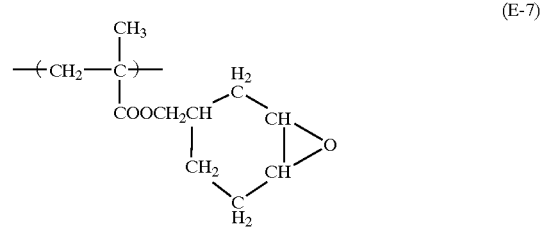

(E-7)

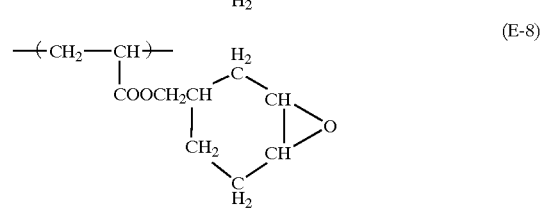

(E-8)

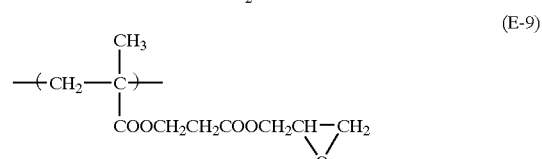

(E-9)

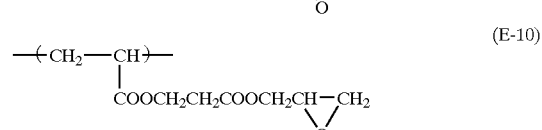

(E-10)

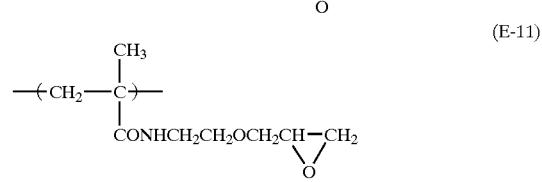

(E-11)

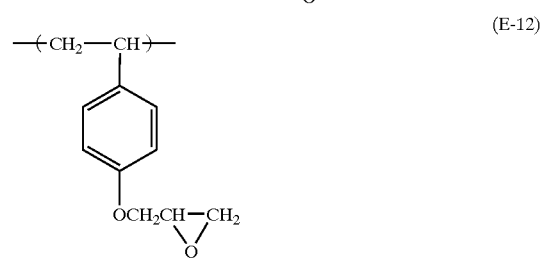

(E-12)

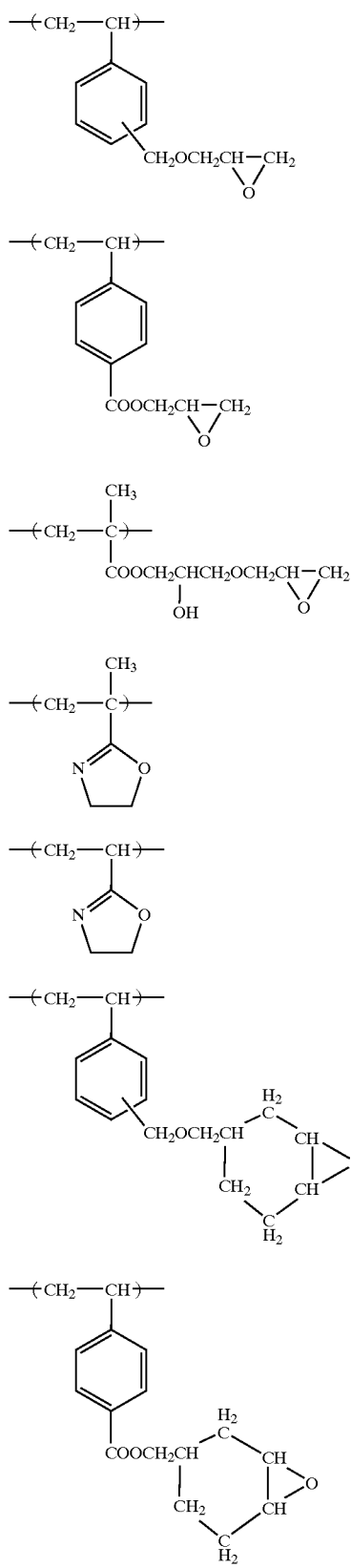
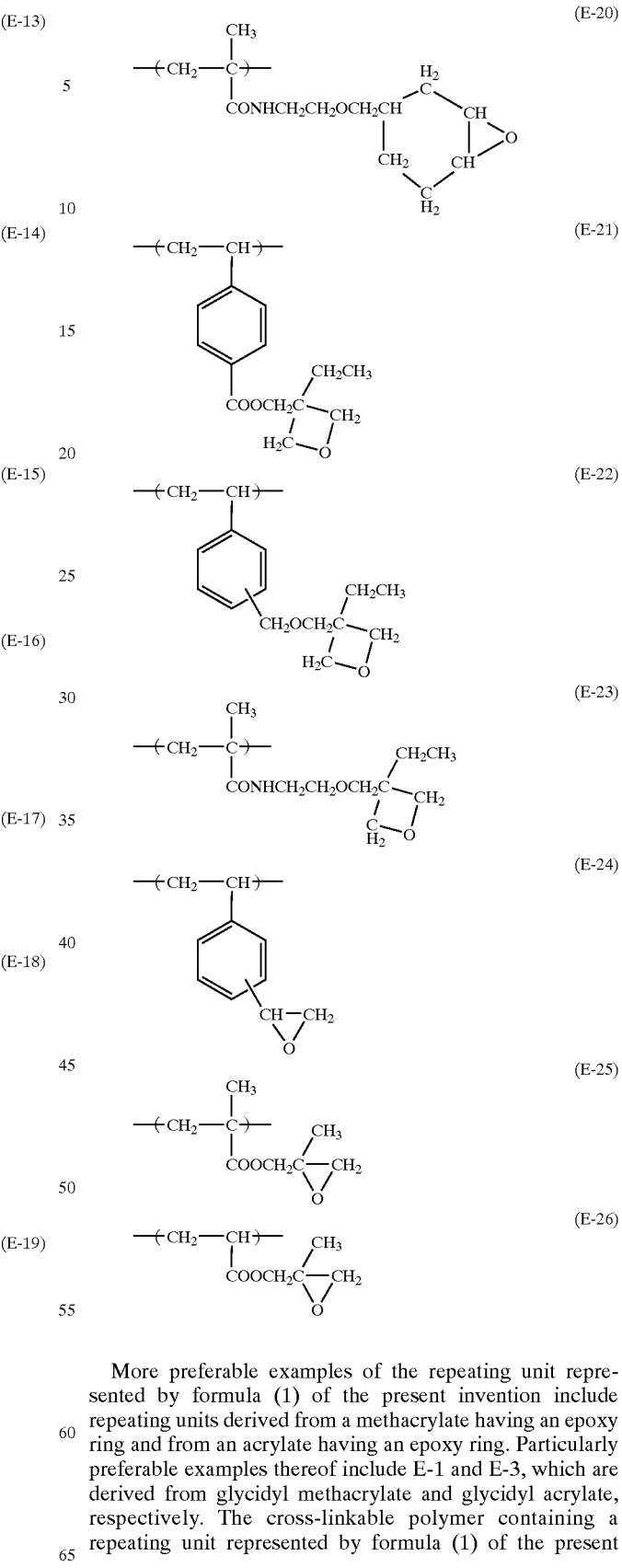

More preferable examples of the repeating unit represented by formula (1) of the present invention include repeating units derived from a methacrylate having an epoxy ring and from an acrylate having an epoxy ring. Particularly preferable examples thereof include E-1 and E-3, which are derived from glycidyl methacrylate and glycidyl acrylate, respectively. The cross-linkable polymer containing a repeating unit represented by formula (1) of the present invention may be a copolymer formed from a plurality of types of repeating unit represented by formula (1), and among these a copolymer containing either E-1 or E-3 can particularly effectively reduce the cure shrinkage.

The cross-linkable polymer containing a repeating unit represented by formula (1) of the present invention can be a copolymer containing another repeating unit in addition to one represented by formula (1) (for example, a repeating unit containing no group capable of ring-opening polymerization). In particular, with the object of controlling the Tg and the hydrophilicity/hydrophobicity of the cross-linkable polymer and the content of the group capable of ring-opening polymerization in the cross-linkable polymer, a copolymer containing a repeating unit other than those represented by formula (1) can be used. A repeating unit other than those represented by formula (1) is preferably introduced by a method in which the corresponding monomer is subjected to copolymerization.

When a repeating unit other than those represented by formula (1) is introduced by copolymerization of the corresponding vinyl monomer, the following monomers are preferably used: esters and amides derived from acrylic acid and α-alkylacrylic acids (e.g., methacrylic acid, etc.) such as N-i-propylacrylamide, N-n-butyl acrylamide, N-t-butylacrylamide, N,N-dimethylacrylamide, N-methylmethacrylamide, acrylamide, 2-acrylamido-2-methylpropanesulphonic acid, acrylamidopropyltrimethylammonium chloride, methacrylamide, diacetone acrylamide, acryloylmorpholine, N-methylolacrylamide, N-methylolmethacrylamide, methyl acrylate, ethyl acrylate, hydroxyethyl acrylate, n-propyl acrylate, i-propyl acrylate, 2-hydroxypropyl acrylate, 2-methyl-2-nitropropyl acrylate, n-butyl acrylate, i-butyl acrylate, t-butyl acrylate, t-pentyl acrylate, 2-methoxyethyl acrylate, 2-ethoxyethyl acrylate, 2-methoxymethoxyethyl acrylate, 2,2,2-trifluoroethyl acrylate, 2,2-dimethylbutyl acrylate, 3-methoxybutyl acrylate, ethyl Carbitol acrylate, phenoxyethyl acrylate, n-pentyl acrylate, 3-pentyl acrylate, octafluoropentyl acrylate, n-hexyl acrylate, cyclohexyl acrylate, cyclopentyl acrylate, cetyl acrylate, benzyl acrylate, n-octyl acrylate, 2-ethylhexyl acrylate, 4-methyl-2-propylpentyl acrylate, heptadecafluorodecyl acrylate, n-octadecyl acrylate, methyl methacrylate, 2,2,2-trifluoroethyl methacrylate, tetrafluoropropyl methacrylate, hexafluoropropyl methacrylate, hydroxyethyl methacrylate, 2-hydroxypropyl methacrylate, n-butyl methacrylate, i-butyl methacrylate, sec-butyl methacrylate, n-octyl methacrylate, 2-ethylhexyl methacrylate, 2-methoxyethyl methacrylate, 2-ethoxyethyl methacrylate, benzyl methacrylate, heptadecafluorodecyl methacrylate, n-octadecyl methacrylate, 2-isobornyl methacrylate, 2-norbornylmethyl methacrylate, 5-norbornen-2-ylmethyl methacrylate, 3-methyl-2-norbornylmethyl methacrylate and dimethylaminoethyl methacrylate; acrylic acid and α-alkylacrylic acids such as acrylic acid, methacrylic acid and itaconic acid; vinyl esters such as vinyl acetate; esters derived from maleic acid and fumaric acid such as dimethyl maleate, dibutyl maleate and diethyl fumarate; maleimides such as N-phenylmaleimide; maleic acid; fumaric acid; sodium p-styrenesulfonate; acrylonitrile; methacrylonitrile; dienes such as butadiene, cyclopentadiene and isoprene; aromatic vinyl compounds such as styrene, p-chlorostyrene, t-butylstyrene, α-methylstyrene and sodium styrenesulfonate; N-vinylpyrrolidone; N-vinyloxazolidone; N-vinylsuccinimide; N-vinylformamide; N-vinyl-N-methylformamide; N-vinylacetamide; N-vinyl-N-methylacetamide; 1-vinylimidazole; 4-vinylpyridine; vinylsulfonic acid; sodium vinylsulfonate; sodium allylsulfonate; sodium methallylsulfonate; vinylidene chloride; vinyl alkyl ethers such as methyl vinyl ether; ethylene; propylene; 1-butene; isobutene; etc. These vinyl monomers can be used in a combination of two or more types. In addition to the above-mentioned vinyl monomers, those described in Research Disclosure No. 1955 (July 1980) can be used. In the present invention, the esters and amides derived from acrylic acid and methacrylic acid, and the aromatic vinyl compounds are particularly preferably used as the vinyl monomers.

It is also possible to introduce a repeating unit having a reactive group other than a group capable of ring-opening polymerization as said repeating unit other than those represented by formula (1). In particular, the technique of forming a copolymer having a reactive group other than a group capable of ring-opening polymerization can suitably be employed when the hardcoat layer is required to have a high hardness and when improved adhesion to another functional layer formed on the substrate or the hardcoat is required. With regard to the method of introducing a repeating unit having a reactive group other than a group capable of ring-opening polymerization, a technique of copolymerizing the corresponding vinyl monomer (hereinafter, called 'the reactive monomer') is preferred because of its simplicity.

Specific preferable examples of the reactive monomer are listed below, but the present invention is in no way limited thereby.

Hydroxy-containing vinyl monomers such as hydroxyethyl acrylate, hydroxyethyl methacrylate, allyl alcohol, hydroxypropyl acrylate and hydroxypropyl methacrylate; isocyanate-containing vinyl monomers such as isocyanatoethyl acrylate and isocyanatoethyl methacrylate; N-methylol-containing vinyl monomers such as N-methylolacrylamide and N-methylolmethacrylamide; carboxy-containing vinyl monomers such as acrylic acid, methacrylic acid, itaconic acid, carboxyethyl acrylate and vinyl benzoate; alkyl halide-containing vinyl monomers such as chloromethylstyrene and 2-hydroxy-3-chloropropyl methacrylate; acid anhydride-containing vinyl monomers such as maleic anhydride; formyl-containing vinyl monomers such as acrolein and methacrolein; sulfinic acid-containing vinyl monomers such as potassium styrenesulfinate; active methylene-containing vinyl monomers such as acetoacetoxyethyl methacrylate; acid chloride-containing monomers such as acryloyl chloride and methacryloyl chloride; amino-containing monomers such as allylamine; alkoxysilyl-containing monomers such as methacryloyloxypropyltrimethoxysilane and acryloyloxypropyltrimethoxysilane; etc.

Within the cross-linkable polymer containing a repeating unit represented by formula (1) of the present invention, the proportion of the repeating unit represented by formula (1) is in the range of 30 wt % to 100 wt %, preferably 50 wt % to 100 wt %, and particularly preferably 70 wt % to 100 wt %. In cases where said repeating unit other than those represented by formula (1) does not have a cross-linkable group, the hardness is lowered when its content is too high. In cases where it does have a cross-linkable group, although the hardness can be maintained, the cure shrinkage might increase or the brittleness might be degraded in some cases. The cure shrinkage tends to increase, in particular, in cases where the curing reaction results in a reduction in the molecular weight by dehydration, removal of an alcohol, etc., for example, in the case where a copolymer formed from an alkoxysilyl-containing monomer (e.g., methacryloyloxypropyltrimethoxysilane) and a repeating unit represented by formula (1) is used. When such a repeating unit having a cross-linkable group that undergoes a cross-linking reaction accompanied by a reduction in the molecular weight is incorporated into the cross-linkable polymer containing a repeating unit represented by formula (1), the proportion of the repeating unit represented by formula (1) is preferably in the range of 70 wt % to 99 wt %, more preferably 80 wt % to 99 wt %, and particularly preferably 90 wt % to 99 wt %.

The weight-average molecular weight of the cross-linkable polymer containing a repeating unit represented by formula (1) is preferably in the range of 1,000 to 1,000,000, more preferably 3,000 to 200,000, and most preferably 5,000 to 100,000.

Preferable examples of the cross-linkable polymer containing a repeating unit represented by formula (1) are listed in Table 1 and Table 2 below, but the present invention is in no way limited thereby. The repeating units represented by formula (1) that are specifically cited above are denoted by the same reference codes as in the above-mentioned specific examples, the repeating units that are derived from copolymerizable monomers are denoted by the monomer names, and the copolymer composition ratios are on a wt % basis.

TABLE 1

| Repeating unit structure | | Copolymer composition ratio (wt %) |
|---|---|---|
| K-1 | E-1 | 100 |
| K-2 | E-1/n-butyl methacrylate | 60/40 |
| K-3 | E-1/styrene | 80/20 |
| K-4 | E-1/N-t-butylacrylamide | 80/20 |
| K-5 | E-1/butyl methacrylate/hydroxyethyl methacrylate | 40/50/10 |
| K-6 | E-1/methacryloyloxypropyltrimethoxysilane | 70/30 |
| K-7 | E-1/E-5 | 50/50 |
| K-8 | E-1/E-7 | 50/50 |
| K-9 | E-1/E-11 | 80/20 |
| K-10 | E-5/methyl methacrylate | 70/30 |
| K-11 | E-7 | 100 |
| K-12 | E-7/E-17 | 60/40 |
| K-13 | E-13 | 100 |
| K-14 | E-14/E-1 | 67/33 |
| K-15 | E-17 | 100 |
| K-16 | E-18/chloromethylstyrene | 90/10 |
| K-17 | E-19/N-vinylformamide | 66/34 |
| K-18 | E-3/vinyl acetate | 90/10 |
| K-19 | E-21/E-3 | 30/70 |
| K-20 | E-22/N-phenylmaleimide | 50/50 |

TABLE 2

| Repeating unit structure | | Copolymer composition ratio (wt %) |
|---|---|---|
| K-21 | E-3 | 100 |
| K-22 | E-1/E-3 | 70/30 |
| K-23 | E-2 | 100 |
| K-24 | E-5 | 100 |
| K-25 | E-5/E-1 | 90/10 |
| K-26 | E-8 | 100 |
| K-27 | E-7/E-1 | 80/20 |
| K-28 | E-25 | 100 |
| K-29 | E-26 | 100 |
| K-30 | E-25/E-1 | 50/50 |
| K-31 | E-12 | 100 |
| K-32 | E-12/E-1 | 50/50 |
| K-33 | E-1/2-hydroxyethyl methacrylate | 80/20 |
| K-34 | E-1/methacryloyloxyethyl isocyanate | 80/20 |
| K-35 | E-1/N-methoxymethylacrylamide | 80/20 |
| K-36 | E-1/acryloylmorpholine | 80/20 |

The compound having at least two ethylenically unsaturated groups in the molecule that can be used in the present invention is explained below. Preferred types of the ethylenically unsaturated group are acryloyl, methacryloyl, styryl and vinyl ether, more preferably methacryloyl and acryloyl, and particularly preferably acryloyl. The compound containing an ethylenically unsaturated group has at least two ethylenically unsaturated groups in the molecule, and more preferably at least three ethylenically unsaturated groups. Among these, compounds having acryloyl groups are preferred, and compounds called polyfunctional acrylate monomers, which have 2 to 6 acrylate ester groups in the molecule, and oligomers called urethane acrylates, polyester acrylates or epoxy acrylates, which have a molecular weight of a few hundred to a few thousand and several acrylate ester groups are preferably used.

Specific examples of the compound having at least two ethylenically unsaturated groups in the molecule include divinylbenzene; polyol polyacrylates such as ethylene glycol diacrylate, trimethylolpropane triacrylate, di-trimethylolpropane tetraacrylate, pentaerythritol triacrylate, pentaerythritol tetraacrylate, dipentaerythritol pentaacrylate and dipentaerythritol hexaacrylate; epoxy acrylates such as bisphenol A diglycidyl ether diacrylate and hexanediol diglycidyl ether diacrylate; and urethane acrylates obtained by the reaction of a polyisocyanate and a hydroxy-containing acrylate such as hydroxyethyl acrylate. These compounds are also available as commercial products such as EB-600, EB-40, EB-140, EB-1150, EB-1290K, IRR214, EB-2220, TMPTA, TMPTMA (all manufactured by Daicel-UCB Co., Ltd.), UV-6300 and UV-1700B (both manufactured by The Nippon Synthetic Chemical Industry Co., Ltd.).

Among the above-mentioned compounds having at least two ethylenically unsaturated groups in the molecule, a compound having at least three acryloyl groups and an acryloyl equivalent weight of 120 or below is particularly preferably used. Specific examples thereof include trimethylolpropane triacrylate, di-trimethylolpropane tetraacrylate, pentaerythritol triacrylate, pentaerythritol tetraacrylate, dipentaerythritol pentaacrylate and dipentaerythritol hexaacrylate.

In the present invention it is also possible to use a cross-linkable polymer containing a repeating unit represented by formula (2) as the compound having at least two ethylenically unsaturated groups in the molecule. The cross-linkable polymer containing a repeating unit represented by formula (2) is explained in detail below.

Formula (2)

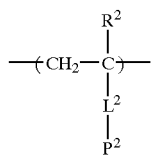

In formula (2), $R^2$ denotes hydrogen or a $C_1$ to $C_4$ alkyl group, and preferably hydrogen or methyl. $P^2$ is a monovalent group containing an ethylenically unsaturated group. $L^2$ is a single bond or a divalent linking group, and preferably a single bond, —O—, an alkylene group, an arylene group, *—COO—, *—CONH—, *—OCO— or *—NHCO— (which are connected to the main chain on the side denoted by *) Preferable examples of $P^2$ include monovalent groups containing an acryloyl, methacryloyl, or styryl group, and most preferably a monovalent group containing an acryloyl group.

Specific preferable examples of the repeating unit represented by formula (2) are illustrated below, but the present invention is in no way limited thereby.

(A-1)
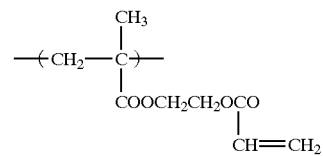

(A-2)
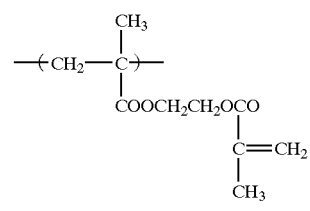

(A-3)
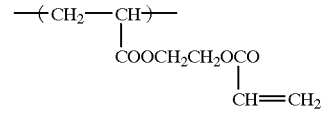

(A-4)
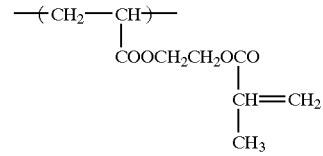

(A-5)
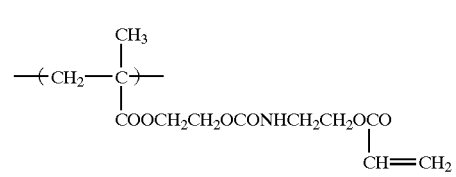

(A-6)
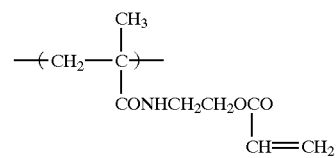

(A-7)
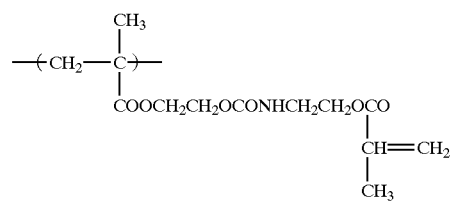

(A-8)
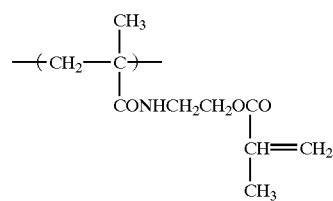

(A-9)
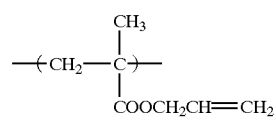

(A-10)
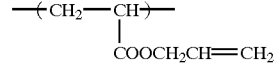

(A-11)
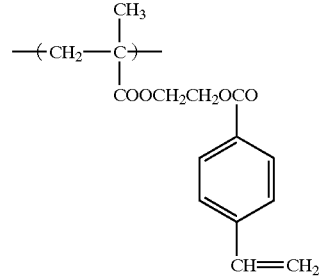

(A-12)
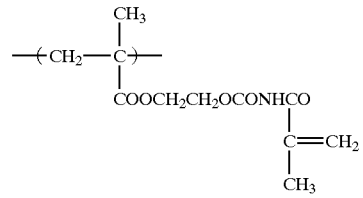

(A-13)
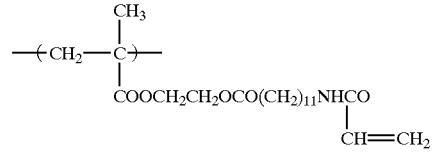

(A-14)
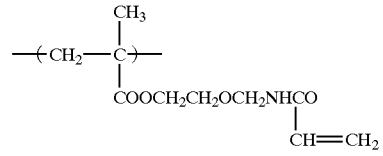

(A-15)
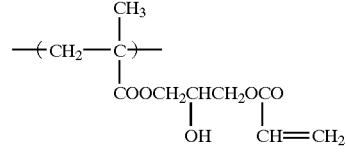

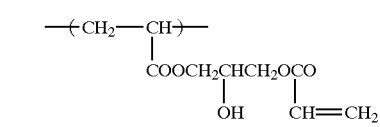 (A-16)
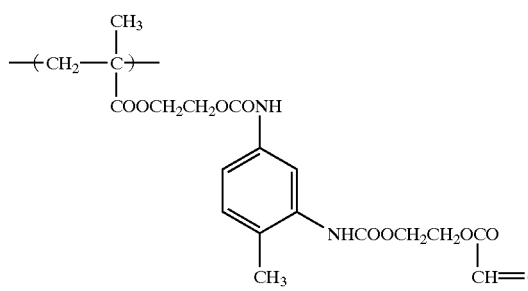 (A-17)
(A-18)
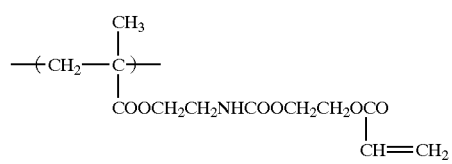 (A-19)
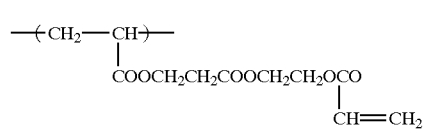 (A-20)
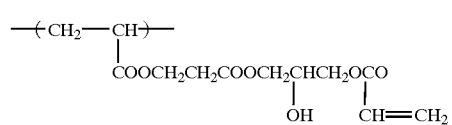 (A-21)
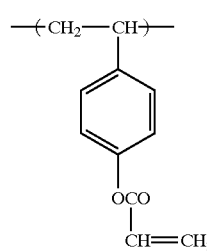 (A-22)
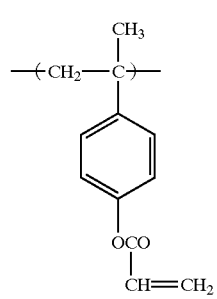
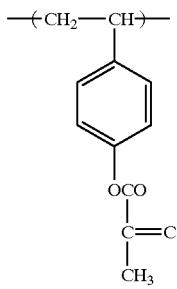 (A-23)
(A-24)
(A-25)
(A-26)
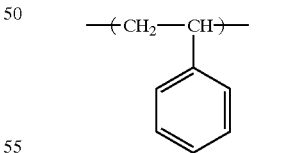 (A-27)
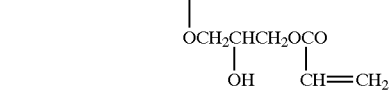

(A-28) 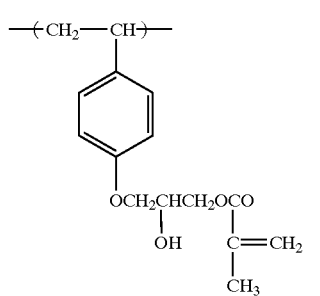

(A-29) 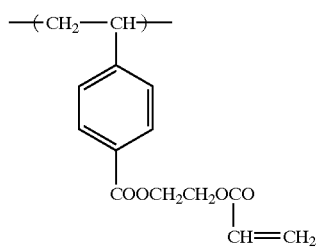

(A-30) 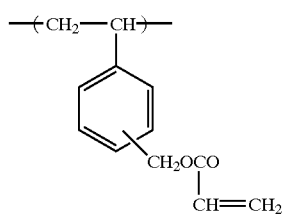

(A-31) 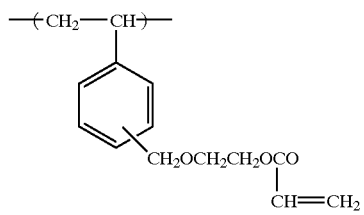

(A-32) 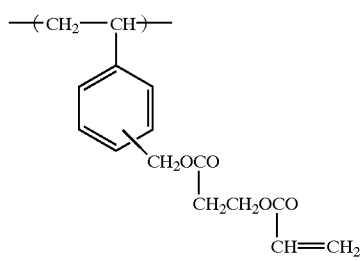

(A-33) 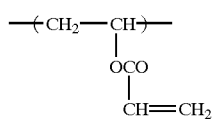

(A-34) 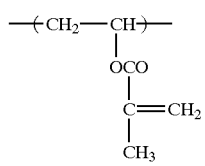

(A-35) 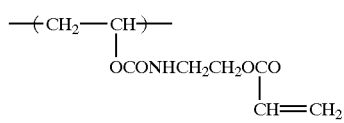

(A-36) 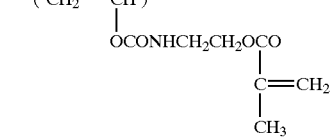

(A-37) 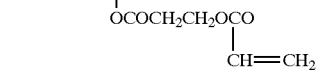

(A-38) 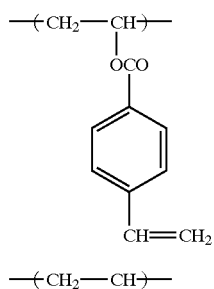

(A-39) 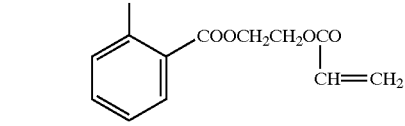

(A-40) 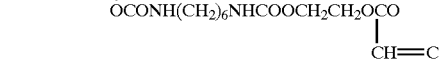

(A-41) 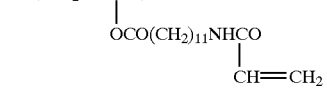

(A-42) 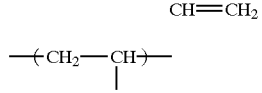

(A-43) 

(A-44) 
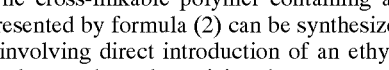

The cross-linkable polymer containing a repeating unit represented by formula (2) can be synthesized by technique (a) involving direct introduction of an ethylenically unsaturated group by polymerizing the corresponding monomer, or technique (b) involving a macromolecular reaction to introduce an ethylenically unsaturated group into a polymer that has been obtained by polymerization of a monomer having any functional group. It is also possible to synthesize the cross-linkable polymer by a combination of techniques (a) and (b). Examples of the polymerization include radical polymerization, cationic polymerization and anionic polymerization. When employing the above-mentioned technique (a), it is necessary to utilize a difference in polymerizability between an ethylenically unsaturated group that is to be consumed by the polymerization and an ethylenically unsaturated group that is to remain in the cross-linkable polymer. For example, when a monovalent group containing an acryloyl or methacryloyl group is used preferably as $P^2$ of formula (2), the cross-linkable polymer of the present invention can be obtained by the above-mentioned technique (a) in which the polymerization to form a cross-linkable polymer is carried out by cationic polymerization. When $P^2$ is a monovalent group containing a styryl group, since gelling can easily occur regardless of whether radical polymerization, cationic polymerization or anionic polymerization is employed, the cross-linkable polymer of the present invention is usually synthesized by the above-mentioned technique (b).

The above-mentioned technique (b), which uses a macromolecular reaction, can produce a cross-linkable polymer regardless of the type of ethylenically unsaturated group that is introduced into the cross-linkable polymer represented by formula (2), and it is therefore a useful technique. Examples of the macromolecular reaction include I) a method in which a polymer is formed having a functional group that is a precursor of an ethylenically unsaturated group, such as, for example 2-chloroethyl, from which hydrochloric acid can be eliminated, and the functional group is then converted into an ethylenically unsaturated group by elimination, oxidation, reduction, protecting-group removal, etc., and II) a method in which, after a polymer having any functional group is formed, it is reacted with a compound having both an ethylenically unsaturated group and a functional group that can undergo a bond formation reaction with the functional group of the polymer to form a covalent bond (hereinafter, called a 'reactive monomer'). These methods I) and II) can be carried out in combination. The bond formation reaction referred to here is not particularly limited as long as it is a bond formation reaction that is generally used in the field of organic synthesis and can form a covalent bond. Since there are cases where the ethylenically unsaturated group contained in the cross-linkable polymer undergoes thermal polymerization during the reaction to form a gel, the reaction is preferably carried out at as low a temperature as possible (preferably at 60° C. or below, and particularly preferably at room temperature or below). It is also possible to use a catalyst in order to promote the reaction and a polymerization inhibitor in order to suppress gelling.

Examples of preferable combinations of functional groups that undergo the macromolecular bond formation reaction are listed below, but the present invention is in no way limited thereby.

Examples of combinations of functional groups that can undergo the reaction on heating or at room temperature include;

(A) a hydroxy group in combination with an epoxy group, an isocyanate group, an N-methylol group, a carboxyl group, an alkyl halide, an acid anhydride, an acid chloride, an active ester group (e.g., sulfate ester), a formyl group, or an acetal group;

(B) an isocyanate group in combination with a hydroxy group, a mercapto group, an amino group, a carboxyl group, or an N-methylol group;

(C) a carboxyl group in combination with an epoxy group, an isocyanate group, an amino group, or an N-methylol group;

(D) an N-methylol group in combination with an isocyanate group, an N-methylol group an amino group, or a hydroxy group;

(E) an epoxy group in combination with a hydroxy group, an amino group, a mercapto group, a carboxyl group, or an N-methylol group;

(F) a vinylsulfone group in combination with a sulfinic acid group or an amino group;

(G) a formyl group in combination with a hydroxy group, a mercapto group, or an active methylene group;

(H) a mercapto group in combination with a formyl group, a vinyl group (e.g., an ally group or an acryl group), an epoxy group, an isocyanate group, an N-methylol group, a carboxyl group, an alkyl halide, an acid anhydride, an acid chloride, or an active ester group (e.g., a sulfate ester); and (I) an amino group in combination with a formyl group, a vinyl group (e.g., an ally group or an acryl group), an epoxy group, an isocyanate group, an N-methylol group, a carboxyl group, an alkyl halide, an acid anhydride, an acid chloride, or an active ester group (e.g., a sulfate ester).

Specific preferable examples of the reactive monomer are listed below, but the present invention is in no way limited thereby.

Hydroxy-containing vinyl monomers (e.g., hydroxyethyl acrylate, hydroxyethyl methacrylate, allyl alcohol, hydroxypropyl acrylate, and hydroxypropyl methacrylate), isocyanate-containing vinyl monomers (e.g., isocyanatoethyl acrylate and isocyanatoethyl methacrylate), N-methylol-containing vinyl monomers (e.g., N-methylolacrylamide and N-methylolmethacrylamide), epoxy-containing vinyl monomers (e.g., glycidyl acrylate, glycidyl methacrylate, ally glycidyl ether, and Cyclomer-M100 and A200 (manufactured by Daicel Chemical Industries, Ltd.)), carboxyl-containing vinyl monomers (e.g., acrylic acid, methacrylic acid, itaconic acid, carboxyethyl acrylate, and vinyl benzoate), alkyl halide-containing vinyl monomers (e.g., chloromethylstyrene, and 2-hydroxy-3-chloropropyl methacrylate), acid anhydride-containing vinyl monomers (e.g., maleic anhydride), formyl-containing vinyl monomers (acrolein and methacrolein), sulfinic acid-containing vinyl monomers (e.g., potassium styrenesulfinate), active methylene-containing vinyl monomers (e.g., acetoacetoxyethyl methacrylate), vinyl-containing vinyl monomers (e.g., allyl methacrylate and allyl acrylate), acid chloride-containing monomers (e.g., acryloyl chloride and methacryloyl chloride), and amino-containing monomers (e.g., allylamine) can be cited.

Said polymer having any functional group described in the above-mentioned II) can be obtained by polymerizing a reactive monomer having both a reactive functional group and an ethylenically unsaturated group. It is also possible to obtain the polymer by functional group exchange after polymerizing a precursor monomer having low reactivity, as is the case with polyvinyl alcohol obtained by modifying polyvinyl acetate. The polymerization method in these cases is preferably radical polymerization since it is the most simple method.

The cross-linkable polymer containing a repeating unit represented by formula (2) of the present invention may be a copolymer formed from a plurality of types of repeating unit represented by formula (2), or a copolymer containing an additional repeating unit other than those represented by formula (2) (the additional repeating unit being, for example, a repeating unit containing no ethylenically unsaturated group). The technique employing a copolymer containing an additional repeating unit other than those represented by formula (2) is particularly suitable when controlling the Tg and the hydrophilicity/hydrophobicity of the cross-linkable polymer and the content of the ethylenically unsaturated group in the cross-linkable polymer. The method for introducing a repeating unit other than those represented by formula (2) may employ technique a) involving direct introduction in which the corresponding monomer is copolymerized, or technique b) involving introduction by macromolecular reaction of a polymer formed from a precursor monomer having an exchangeable functional group. It is also possible to combine techniques a) and b).

When introducing a repeating unit other than those represented by formula (2) by technique a) of copolymerizing the corresponding monomer, preferable examples of the monomer are the same as those cited as said repeating unit other than those represented by formula (1) in the explanation of the cross-linkable monomer containing a repeating unit represented by formula (1).

When a repeating unit represented by formula (2) is introduced by the macromolecular reaction as in the above-mentioned technique (b) and the reaction is stopped before completion, the polymer so obtained is a copolymer containing a repeating unit having a reactive functional group and a repeating unit having a functional group that is a precursor of an ethylenically unsaturated group, and this copolymer can also be used in the present invention without any particular limitation.

It is also possible for most of the types of repeating unit containing no ethylenically unsaturated group that are derived from the above-mentioned vinyl monomers to be introduced by the above-mentioned technique b) involving macromolecular reaction of a polymer formed from the precursor monomer having an exchangeable functional group. The cross-linkable polymer containing a repeating unit represented by formula (2) of the present invention may contain a repeating unit other than those represented by formula (2), and in this case the repeating unit can only be introduced by a macromolecular reaction. Typical examples thereof include polyvinyl alcohol obtained by modifying polyvinyl acetate, and polyvinyl butyral obtained by converting polyvinyl alcohol into its acetal derivative. Specific examples of these repeating units are listed below, but the present invention is in no way limited thereby.

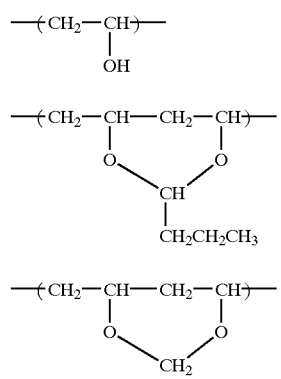

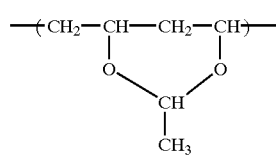

Within the cross-linkable polymer containing a repeating unit represented by formula (2) of the present invention, the proportion of the repeating unit represented by formula (2) is preferably in the range of 30 wt % to 100 wt %, more preferably 50 wt % to 100 wt %, and particularly preferably 70 wt % to 100 wt %.

The weight-average molecular weight of the cross-linkable polymer containing a repeating unit represented by formula (2) is preferably in the range of 1,000 to 1,000,000, more preferably 3,000 to 200,000, and most preferably 5,000 to 100,000.

Preferable examples of the cross-linkable polymer containing a repeating unit represented by formula (2) are listed in Table 3 below, but the present invention is in no way limited thereby. In the table, the repeating units represented by formula (2) that are cited above and repeating units such as those in polyvinyl alcohol are denoted by the same reference codes as in the above-mentioned specific examples, the repeating units that are derived from copolymerizable monomers are denoted by the monomer names, and the copolymer composition ratios are on a wt % basis.

TABLE 3

| | Repeating unit structure | Copolymer composition ratio (wt %) |
|---|---|---|
| P-1 | A-1 | 100 |
| P-2 | A-1/n-butyl methacrylate | 60/40 |
| P-3 | A-1/styrene | 80/20 |
| P-4 | A-1/N-t-butylacrylamide | 80/20 |
| P-5 | A-1/butyl methacrylate/hydroxyethyl methacrylate | 38/50/12 |
| P-6 | A-1/A-7/hydroxyethyl methacrylate | 20/67/13 |
| P-7 | A-1/A-9 | 80/20 |
| P-8 | A-1/A-11 | 50/50 |
| P-9 | A-6 | 100 |
| P-10 | A-13 | 100 |
| P-11 | A-14/hydroxyethyl methacrylate | 33/67 |
| P-12 | A-15/methacrylic acid | 87/13 |
| P-13 | A-20/carboxyethyl acrylate | 67/33 |
| P-14 | A-21 | 100 |
| P-15 | A-21/N-vinylformamide | 90/10 |
| P-16 | A-25/4-hydroxystyrene | 66/34 |
| P-17 | A-30/chloromethylstyrene/N-phenylmaleimide | 23/27/50 |
| P-19 | A-33/N-1/vinyl acetate | 88/11/1 |
| P-20 | A-37/N-1/vinyl acetate | 93/6/1 |
| P-21 | A-38/N-1/N-2/vinyl acetate | 22/8/69/1 |
| P-22 | A-40/N-1/vinyl acetate | 77/22/1 |

The cross-linkable polymer containing both a repeating unit represented by formula (1) and a repeating unit represented by formula (2) of the present invention is explained in detail below. The repeating unit represented by the above-mentioned formula (1) and the repeating unit represented by the above-mentioned formula (2) referred to here are the same as those described above, and preferable examples thereof are the same as mentioned above. The cross-linkable polymer containing both a repeating unit represented by formula (1) and a repeating unit represented by formula (2) may be a copolymer formed from a plurality of types of repeating units represented by formulae (1) and (2), or may be a copolymer containing an additional repeating unit other than those represented by formulae (1) and (2). It may be a copolymer containing an additional repeating unit having a reactive group other than the ethylenically unsaturated groups and the groups capable of ring-opening polymerization. In all cases, preferable examples are the same as those cited above.

Within the cross-linkable polymer containing both a repeating unit represented by formula (1) and a repeating unit represented by formula (2), the proportion of the repeating unit represented by formula (1) is in the range of 1 wt % to 99 wt %, preferably 20 wt % to 80 wt %, and particularly preferably 30 wt % to 70 wt %, and the proportion of the repeating unit represented by formula (2) is in the range of 1 wt % to 99 wt %, preferably 20 wt % to 80 wt %, and particularly preferably 30 wt % to 70 wt %. In cases where the cross-linkable polymer containing both a repeating unit represented by formula (1) and a repeating unit represented by formula (2) is a copolymer further containing a repeating unit other than those represented by formula (1) and formula (2), when the content of the repeating unit other than those represented by formula (1) and formula (2) that does not have a cross-linkable group is too high, the hardness is lowered. When it does have a cross-linkable group, although the hardness can be maintained, the cure shrinkage might increase or the brittleness might be degraded in some cases. The cure shrinkage tends to increase, in particular, in cases where the curing reaction results in a reduction in the molecular weight by dehydration, removal of an alcohol, etc., for example, in the case where a ternary copolymer formed from an alkoxysilyl-containing monomer (e.g., methacryloyloxypropyltrimethoxysilane), a repeating unit represented by formula (1), and a repeating unit represented by formula (2) is used. When such a repeating unit having a cross-linkable group that undergoes a cross-linkable reaction accompanied by a reduction in the molecular weight is incorporated into the cross-linkable polymer containing both a repeating unit represented by formula (1) and a repeating unit represented by formula (2), the combined proportion of the repeating unit represented by formula (1) and the repeating unit represented by formula (2), is preferably in the range of 70 wt % to 99 wt %, more preferably 80 wt % to 99 wt %, and particularly preferably 90 wt % to 99 wt %.

The weight-average molecular weight of the cross-linkable polymer containing both a repeating unit represented by formula (1) and a repeating unit represented by formula (2) is preferably in the range of 1,000 to 1,000,000, more preferably 3,000 to 200,000, and most preferably 5,000 to 100,000.

Preferable examples of the cross-linkable polymer containing both a repeating unit represented by formula (1) and a repeating unit represented by formula (2) are listed in Table 4, but the present invention is in no way limited thereby. In the table, the repeating units represented by formulae (1) and (2) that are cited above and repeating units such as that in polyvinyl alcohol are denoted by the same reference codes as in the above-mentioned specific examples, the repeating units that are derived from copolymerizable monomers are denoted by the monomer names, and the copolymer composition ratios are on a wt % basis.

TABLE 4

| | Repeating unit structure | Copolymer composition ratio (wt %) |
|---|---|---|
| C-1 | A-1/E-1 | 70/30 |
| C-2 | A-1/E-1/n-butyl methacrylate | 60/30/10 |
| C-3 | A-1/E-1/styrene | 40/40/20 |
| C-4 | A-1/E-4/N-t-butylacrylamide | 50/30/20 |
| C-5 | A-1/E-5/E-7 | 40/40/20 |
| C-6 | A-1/A-7/hydroxyethyl methacrylate/E-1 | 30/27/13/30 |
| C-7 | A-1/A-9/E-12 | 60/10/30 |
| C-8 | A-1/A-11/E-17 | 30/50/20 |
| C-9 | A-6/E-5 | 40/60 |
| C-10 | A-15/E-1 | 53/47 |
| C-11 | A-21/E-1 | 35/65 |
| C-12 | A-1/E-7/N-vinylformamide | 60/30/10 |
| C-13 | A-25/E-19 | 60/40 |
| C-14 | A-30/E-14/N-phenylmaleimide | 60/30/10 |
| C-15 | A-33/E-12/N-1/vinyl acetate | 68/20/11/1 |
| C-16 | A-3/A-9/E-12 | 40/30/30 |
| C-17 | A-18/E-5 | 60/40 |
| C-18 | A-29/E-21 | 50/50 |
| C-19 | A-31/E-22 | 65/35 |
| C-20 | A-3/A-6/E-14 | 20/45/35 |

The curable composition of the present invention is either a composition containing both a cross-linkable polymer containing a repeating unit represented by formula (1) and a compound containing at least two ethylenically unsaturated groups in the molecule, or a composition containing a cross-linkable polymer containing both a repeating unit represented by formula (1) and a repeating unit represented by formula (2).

When the curable composition of the present invention contains both a cross-linkable polymer containing a repeating unit represented by formula (1) and a compound containing at least two ethylenically unsaturated groups in the molecule, although the mixing ratio of the cross-linkable polymer containing a repeating unit represented by formula (1) and the compound containing at least two ethylenically unsaturated groups in the molecule depends on the type of compound used, the proportion of the compound containing an ethylenically unsaturated group is preferably in the range of 30 wt % to 90 wt %, and more preferably 50 wt % to 80 wt %.

The curable composition of the present invention can further contain a compound containing a group capable of ring-opening polymerization other than the cross-linkable polymers containing a repeating unit represented by formula (1). The compound containing a group capable of ring-opening polymerization referred to here is a compound having a ring structure that can undergo ring-opening polymerization by the action of a cation, an anion, a radial, etc., and among these polymerization reactions, cationic ring-opening polymerization of a heterocyclic compound is preferred. Examples of such a compound include an epoxy derivative, an oxetane derivative, a tetrahydrofuran derivative, a cyclic lactone derivative, a cyclic carbonate derivative, and a cyclic iminoether such as an oxazoline derivative; and an epoxy derivative, an oxetane derivative, and an oxazoline derivative are particularly preferable. The number of groups capable of ring-opening polymerization present in the molecule of the compound is not particularly limited as long as there is at least one group, but it is more preferable to use a compound having at least two groups capable of ring-opening polymerization. Specific examples of such a compound include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, a polyglycidyl ether of a cresol novolac resin, and a polyglycidyl ether of a phenol novolac resin; alicyclic epoxides such as Celoxide 2021P, Celoxide 2081, Epolead GT-301, Epolead GT-401, EHPE 3150CE (all manufactured by Daicel Chemical Industries, Ltd.), and a polycyclohexylepoxymethyl ether of a phenol novolac resin; and oxetanes such as OXT-121, OXT-221, OX-SQ, and PNOX-1009 (all manufactured by Toagosei Co., Ltd.).

The curable composition of the present invention can also contain a compound having one ethylenically unsaturated group in the molecule. Preferable examples of such a compound include the above-mentioned copolymerizable vinyl monomers and reactive monomers that are described in the explanation of the cross-linkable polymer containing a repeating unit represented by formula (1).

In the case where the curable composition of the present invention contains both the cross-linkable polymer containing a repeating unit represented by formula (1) and a compound containing at least two ethylenically unsaturated groups in the molecule, the amount added of said compound containing a group capable of ring-opening polymerization other than the cross-linkable polymers containing a repeating unit represented by formula (1), plus the amount added of the compound containing one ethylenically unsaturated group in the molecule is 50 wt % or below relative to the total amount, including the cross-linkable polymers, of all the compounds containing a group capable of ring-opening polymerization plus the compounds containing an ethylenically unsaturated group, and preferably 30 wt % or below.

When the curable composition of the present invention contains a cross-linkable polymer containing both a repeating unit represented by formula (1) and a repeating unit represented by formula (2), it is also possible to add a compound containing a group capable of ring-opening polymerization other than the cross-linkable polymer containing both a repeating unit represented by formula (1) and a repeating unit represented by formula (2), and preferable examples of the compound are the same as described above. It is also possible to add a compound containing an ethylenically unsaturated group other than the cross-linkable polymer containing both a repeating unit represented by formula (1) and a repeating unit represented by formula (2). In this case, the compound may contain at least one ethylenically unsaturated group in the molecule, more preferably at least two groups, and particularly preferably at least three groups. Preferable examples of the compound containing one ethylenically unsaturated group in the molecule include the above-mentioned copolymerizable vinyl monomers and reactive monomers that are cited in the explanation of the cross-linkable polymer containing a repeating unit represented by formula (1). Examples and preferable examples of the compound containing at least two ethylenically unsaturated groups in the molecule are the same as those cited as examples when the cross-linkable polymer containing a repeating unit represented by formula (1) is used in combination therewith.

When the curable composition of the present invention contains the cross-linkable polymer containing both a repeating unit represented by formula (1) and a repeating unit represented by formula (2), the amount added of the compound containing a group capable of ring-opening polymerization plus the amount added of the compound containing an ethylenically unsaturated group, other than the cross-linkable polymer containing both a repeating unit represented by formula (1) and a repeating unit represented by formula (2), depends on the ratio of the repeating units represented by formulae (1) and (2) that are present in the cross-linkable polymer containing both a repeating unit represented by formula (1) and a repeating unit represented by formula (2), but the amount is 50 wt % or below relative to the total amount, including the cross-linkable polymer, of all the compounds containing a group capable of ring-opening polymerization and the compounds containing an ethylenically unsaturated group, and preferably 30 wt % or below.

In the present invention, it is preferable that cross-linking reactions proceed both among the compounds containing an ethylenically unsaturated group and among the compounds containing a group capable of ring-opening polymerization. The cross-linking reaction of the ethylenically unsaturated group is preferably a radical polymerization reaction, and the cross-linking , reaction of the group capable of ring-opening polymerization is preferably a cationic polymerization reaction. Both of these polymerization reactions can proceed by the action of heat and/or light. A general method usually employs a small amount of a radical generator or a cation generator (or an acid generator), which are called polymerization initiators and are decomposed by heat and/or light to generate a radical or a cation, thus effecting the polymerization. The radical polymerization and the cationic polymerization can be carried out separately, but they are preferably carried out simultaneously. As a method of carrying out a cross-linking reaction without the addition of a radical generator, there is a method involving simple heating, but a method involving irradiation with an electron beam is preferably used.

When a plastic film is used as a substrate in the present invention, since the heat resistance of the plastic film itself is low, if curing is carried out by heating, the temperature is preferably as low as possible. That is to say, the heating temperature is 140° C. or below, and more preferably 100° C. or below. When curing is carried out by the action of light, the cross-linking reaction often proceeds at a low temperature, which is therefore preferably employed. A method employing activation energy radiation such as radioactive radiation, gamma rays, alpha rays, electron beams or UV rays is further preferred, and a method in which a polymerization initiator that generates a radical or a cation by irradiation with UV rays is added and curing is carried out by UV radiation is particularly preferable. The temperature at which the activation energy radiation is applied is not particularly limited, but it is often advantageous to employ a low temperature since volume shrinkage after curing can be suppressed, and when a plastic film is used as a substrate, deformation of the substrate can be suppressed. The temperature in this method is preferably 80° C. or below, and more preferably 50° C. or below. It is also possible in some cases to carry out heating after the irradiation with activation energy radiation so as to further promote the curing, and this method can be employed if necessary. The heating temperature in this method is preferably 140° C. or below.

With regard to a photo-acid generator that generates a cation by the action of light, an ionic compound such as a triarylsulfonium salt or a diaryliodonium salt and a nonionic compound such as nitrobenzyl sulfonate can be cited as examples, and it is also possible to use various known photo-acid generators such as compounds described in 'Organic Materials for Imaging (Imaging yo Yukizairyou)' edited by The Japanese Research Association for Organic Electronics Materials, Bunshin Publishing Co. (1997). Among these compounds, sulfonium salts and iodonium salts are particularly preferable, and the counter ion is preferably $PF_6^-$, $SbF_6^-$, $AsF_6^-$, $B(C_6F_5)_4^-$, etc.

Preferable examples of the polymerization initiator that generates a radical by the action of light include an acetophenone compound, a benzoin ether compound, a benzil compound, a benzophenone compound and a thioxanthone compound. Examples of the acetophenone compound include 2,2-diethoxyacetophenone, 2-hydroxymethyl-1-phenylpropan-1-one, 4'-isopropyl-2-hydroxy-2-methylpropiophenone, 2-hydroxy-2-methylpropiophenone, p-dimethylaminoacetone, p-tert-butyldichloroacetophenone, p-tert-butyltrichloroacetophenone, and p-azidobenzalacetophenone. Examples of the benzil compound include benzil, benzil dimethyl ketal, benzil-β-methoxyethyl acetal, and 1-hydroxycyclohexyl phenyl ketone. Examples of the benzoin ether compound include benzoin, benzoin methyl ether, benzoin ethyl ether, benzoin n-propyl ether, benzoin isopropyl ether, benzoin n-butyl ether, and benzoin isobutyl ether. Examples of the benzophenone compound include benzophenone, methyl o-benzoylbenzoate, Michler's ketone, 4,4'-bisdiethylaminobenzophenone, and 4,4'-dichlorobenzophenone. Examples of the thioxanthone compound include thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Among photosensitive radical polymerization initiators comprising such aromatic ketones, the acetophenone compounds and the benzil compounds are particularly preferable in terms of curing properties, storage stability, odor, etc. The photosensitive radical polymerization initiators comprising the above-mentioned aromatic ketones can be used singly or in a combination of two or more types according to a desired performance.

In the present invention it is also possible to use a single sulfonium salt or iodonium salt, which are usually used as photo-acid generators as explained above, since they function as radical generators by the action of light. It is also possible to use a sensitizer in addition to the polymerization initiator in order to enhance the sensitivity. Examples of the sensitizer include n-butylamine, triethylamine, tri-n-butylphosphine, and thioxanthone.

A plurality of types of polymerization initiator may be used in combination, or a compound that can generate both a radical and a cation can be used by itself. The amount of polymerization initiator added is preferably in the range of 0.1 to 15 wt % relative to the total amount, including the cross-linkable polymer, of the compound containing an ethylenically unsaturated group and the compound containing a group capable of ring-opening polymerization that are contained in the curable composition, and more preferably 1 to 10 wt %.

In the present invention, the cross-linkable polymer containing a repeating unit represented by formula (1), the cross-linkable polymer containing a repeating unit represented by formula (2), and the cross-linkable polymer containing both a repeating unit represented by formula (1) and a repeating unit represented by formula (2) (hereinafter, these are together called 'the polymers of the present invention') are usually in the form of a solid or a highly viscous liquid, and it is difficult to coat them on their own. When the polymers are water-soluble or can be made into an aqueous dispersion, they can be coated from an aqueous system, but they are usually coated as a solution in an organic solvent. The organic solvent is not particularly limited as long as it can dissolve the polymers of the present invention. Preferable examples of the organic solvent include a ketone such as methyl ethyl ketone, an alcohol such as isopropanol, and an ester such as ethyl acetate. When the above-mentioned monofunctional or polyfunctional vinyl monomer or compound containing a monofunctional, difunctional or tri- or more functional group capable of ring-opening polymerization is a low molecular weight compound, the combined use thereof with the polymers of the present invention can adjust the viscosity of the curable composition, thereby making it possible to coat the composition without using a solvent.

The curable composition of the present invention can also contain cross-linked fine particles if necessary. The addition of cross-linked fine particles can reduce the extent of cure shrinkage of the hardcoat layer, thereby improving the adhesion to the substrate, and when the substrate is a plastic film it can suppress curling. As the cross-linked fine particles, any one of inorganic cross-linked fine particles, organic cross-linked fine particles, and organic-inorganic composite cross-linked fine particles can be used without particular limitations. Examples of the inorganic cross-linked fine particles include silicon dioxide particles, titanium dioxide particles, zirconium oxide particles, and aluminum oxide particles. These inorganic cross-linked fine particles are generally hard, and adding them to the hardcoat layer can not only improve the cure shrinkage but also enhance the hardness of the surface.

In general, the inorganic cross-linked fine particles have low affinity for an organic component such as the polymer or polyfunctional vinyl monomer of the present invention, and merely mixing them might form aggregates and easily cause cracks in the hardcoat layer after curing. In order to improve the affinity between the inorganic cross-linked fine particles and the organic components in the present invention, the surface of the inorganic cross-linked fine particles can be treated with a surface-modifying agent containing an organic segment. The surface-modifying agent preferably has, in the molecule, both a functional group that can form a bond to the inorganic cross-linked fine particle or can be adsorbed on the inorganic cross-linked fine particle, and a functional group having a high affinity for the organic component. Preferable compounds having a functional group that can be bonded to the inorganic cross-linked fine particle or can be adsorbed thereon include a metal alkoxide compound of a silane, aluminum, titanium, zirconium, etc., and a compound containing an anionic group such as phosphoric acid, a sulfonic acid or a carboxylic acid. The functional group having a high affinity for the organic component may merely have a hydrophilicity/hydrophobicity that is comparable to that of the organic component, but it is preferably a functional group that can form a chemical bond with the organic component, and it is particularly preferably an ethylenically unsaturated group or a group capable of ring-opening polymerization. A preferable surface-modifying agent for inorganic cross-linked fine particles in the present invention is a compound having, in the molecule, a metal alkoxide or an anionic group, and an ethylenically unsaturated group or a group capable of ring-opening polymerization.

Preferable examples of the surface-modifying agent include a coupling agent having an unsaturated double bond or a group capable of ring-opening polymerization, and a phosphoric acid, sulfonic acid, or carboxylic acid compound, which are described below, but the present invention is in no way limited thereby.

S-1 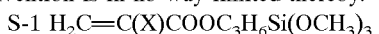

S-2 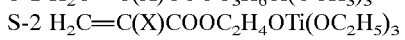

S-3 $H_2C=C(X)COOC_2H_4OCOC_5H_{10}OPO(OH)_2$

S-4 $(H_2C=C(X)COOC_2H_4OCOC_5H_{10}O)_2POOH$

S-5 $H_2C=C(X)COOC_3H_6OSO_3K$

S-6 $H_2C=C(X)COO(C_5H_{10}COO)_2H$

S-7 $H_2C=C(X)COOC_5H_{10}COOH$

S-8 γ-Glycidyloxypropyltrimethoxysilane (X=H or $CH_3$)

The method of modifying the surface of the inorganic cross-linked fine particles can employ any technique known in the art. For example, in the case where the surface modification is carried out in solution, the surface-modifying agent may be present when the inorganic cross-linked fine particles are finely dispersed mechanically, the surface-modifying agent may be added and stirred after the inorganic cross-linked fine particles have been finely dispersed, or the surface modification may be carried out before finely dispersing the inorganic cross-linked fine particles (if necessary, warming, heating after drying, or changing the pH), followed by finely dispersing them. The solvent used here is preferably an organic solvent having high polarity. For example, a known organic solvent such as an alcohol, a ketone, or an ester can be cited. With regard to a dispersing machine, an ultrasonic dispersing machine, a disper, a homogenizer, a dissolver, a Polytron, a paint shaker, a sand grinder, a kneader, an Eiger mill, a Dyno-Mill, a CoBall mill, etc. is preferably used.

Preferable examples of the organic cross-linked fine particles include a cross-linked general-purpose resin material such as polyethylene, polypropylene, polytetrafluoroethylene, nylon, polyethylene terephthalate, polystyrene, a poly(meth)acrylate ester, a poly(meth)acrylamide, polyvinyl chloride, acetylcellulose, nitrocellulose, or polydimethylsiloxane; and cross-linked rubber fine particles of SBR or NBR. The organic cross-linked fine particles can be chosen freely, from soft rubber particles to hard particles. For example, the aforementioned inorganic cross-linked fine particles having high hardness improve the level of cure shrinkage and the hardness when the amount thereof added to the hardcoat layer is increased, but the hardcoat layer becomes brittle in some cases. In such cases, it is preferable to add, together with the inorganic cross-linked fine particles, organic cross-linked fine particles whose hardness has been controlled to a desired level, since the hardcoat layer becomes less brittle. It is also possible to form core-shell particles with a combination of a high hardness core and a low hardness shell, or a low hardness core and a high hardness shell. It is also preferable to form core-shell particles having variations in hydrophilicity/hydrophobicity in order to obtain dispersion stability in the hardcoat layer or in the coating solution. It is also possible to form organic-inorganic composite cross-linked fine particles having inorganic cross-linked fine particles as the core. When using cross-linked fine particles of a core-shell type, both the core and shell parts may be cross-linked, or either one thereof may be cross-linked.

The average particle size of the cross-linked fine particles that can be used in the present invention is in the range of 1 to 20,000 nm, preferably 2 to 1,000 nm, more preferably 5 to 500 nm, and most preferably 10 to 200 nm. The shape of the cross-linked fine particles is not particularly limited, and spherical, rod-shaped, acicular, tabular, etc. can be used. The average particle size referred to in the present invention is an average value for the diameters of circles that have the same area as the projected area of individual particles.

The amount of cross-linked fine particles added is preferably in the range of 1 to 60 vol % of the hardcoat layer after curing, and more preferably 3 to 40 vol %.

In accordance with the present invention, even when the hardness of a substrate itself is low, the hardness of a hardcoated article can be enhanced by increasing the coating thickness of the cured hardcoat layer of the hardcoated article. In the present invention, the coating thickness of the hardcoat layer depends on the hardness of the substrate and is not particularly limited, but the effects of high hardness, fewer cracks and suppressed peel-off of the coating, which are characteristics of the present invention, can be exhibited prominently by increasing the coating thickness of the hardcoat layer. The coating thickness is preferably in the range of 20 to 200 μm, more preferably 30 to 200 μm, yet more preferably 40 to 200 μm, and particularly preferably 50 to 200 μm.

The substrate that can be used in the present invention is not particularly limited, and metal, plastic, glass, wood, paper, etc. can be used. Among these, a plastic substrate is particularly preferred, and a plastic film is more preferably used as the substrate since the effect of the present invention becomes outstanding. The plastic film is not particularly limited. Specific examples thereof include films and sheets of a polyester, polyethylene, polypropylene, cellophane, cellulose triacetate, cellulose diacetate, cellulose acetate butyrate, polyvinyl chloride, polyvinylidene chloride, polyvinyl alcohol, ethylene vinyl alcohol, polystyrene, a polycarbonate, polymethylpentene, polysulfone, polyetherketone, an acrylic, a nylon, a fluoroplastic, polyimide, polyetherimide, polyether sulfone, etc. In particular, a film of a polyester such as polyethylene terephthalate or polyethylene naphthalate; a polycarbonate; a cellulose resin such as cellulose triacetate or diacetyl cellulose, etc. is preferred. Optically, it is often preferable for the film to have good transparency, but it may be semitransparent or opaque depending on the purpose for which it is used. It is also often preferable that there is no anisotropy in the refractive index, but there are cases such as a liquid crystal display device where an anisotropic film is preferred. When the film is too thin, the film strength is low, when it is too thick, the film stiffness is too great, and the thickness is therefore preferably in the range of 20 to 500 μm, and more preferably 80 to 300 μm.

It is preferable that the surface of the hardcoated article of the present invention has a high hardness. The surface hardness of the hardcoated articles referred to in the present invention can be expressed as a pencil hardness according to JIS K5400. The pencil hardness can be evaluated by directly scratching the hardcoated surface of a hardcoated article with a pencil. The pencil hardness in the present invention is not particularly limited since it depends on the type of substrate, but it is preferably 3H to 9H, more preferably 4H to 9H, and particularly preferably 5H to 9H.

The hardcoated article of the present invention can be obtained by forming by coating, on a substrate, a curable composition comprising, in addition to the cross-linkable polymer of the present invention, a compound containing an ethylenically unsaturated group, a compound containing a group capable of ring-opening polymerization, a polymerization initiator, cross-linked fine particles, a solvent, etc., followed by curing. The curable composition can further contain a conventionally known additive such as a UV absorber, a surfactant for the purpose of improving coating performance and an antistatic agent. Examples of the coating method include known coating methods such as curtain coating, dip coating, spin coating, printing coating, spray coating, slot coating, roll coating, slide coating, blade coating, gravure coating and a wire bar method.

Furthermore, in order to enhance the adhesion between the substrate and the hardcoated layer, if desired one of or both surfaces of the substrate can be subjected to a surface treatment by an oxidation method, a roughening method, etc. Specific examples of the above-mentioned surface treatment include a chemical treatment, a mechanical treatment, a corona discharge treatment, a glow discharge treatment, a chromic acid treatment (wet system), a flame treatment, a high frequency treatment, a hot air treatment, an ozone treatment, a UV radiation treatment, an active plasma treatment, and a mixed acid treatment. Moreover, it is possible to provide at least one undercoat layer. Examples of the material for the undercoat layer include copolymers of vinyl chloride, vinylidene chloride, butadiene, (meth) acrylate esters, styrene, vinyl esters, etc., latexes thereof, and water-soluble polymers such as polyester, polyurethane and gelatin.

In the hardcoated article of the present invention, functional layers having various types of function can be provided on the hardcoat layer, such as an antireflection coating, a ultraviolet/infrared absorbing layer, a selective wavelength absorbing layer, an electromagnetic radiation shielding layer, and an anti-contamination layer. These functional layers can be prepared by conventionally known techniques. In order to improve the adhesion between the functional layer and the hardcoat layer of the hardcoated article of the present invention, the hardcoat layer can be subjected to a surface treatment or provided with an adhesive layer. The surface treatment can be preferably carried out by the above-mentioned method that is cited in the explanation of the surface treatment method for the substrate. The adhesive layer can also employ the above-mentioned material that is cited in the explanation of the undercoat layer applied to the substrate.

FIG. 1 is a schematic cross section of an example of an antireflection hard coat film comprising a hard coat layer 2, a high refractive index layer 3 and a low refractive index layer 4 provided in this order, on a support 1.

Among these functional layers, provision of an antireflection layer on the hardcoated article of the present invention can preferably suppress the glare from external light when it is used in various types of display where viewability is required. The antireflection layer is formed from a single layer or a plurality of layers, and a desired reflectance can be obtained by adjusting the refractive index and the thickness of each layer by various known methods. In the case where an antireflection layer is provided for the hardcoated article of the present invention, the reflectance (specular reflectance) is preferably 3.0% or below, and more preferably 1.5% or below.

A hardcoated film obtained by using a plastic film as the substrate of the hardcoated article of the present invention can be used as a surface protection film for various articles by bonding it using an adhesive, etc., and the article to which the hardcoated film is bonded is also defined as the hardcoated article of the present invention. In particular, in the case where a functional layer such as the above-mentioned antireflection layer is formed on top of the hardcoat layer, a high hardness functional film can be provided, which is suitable as a protecting film for a display such as a cathode-ray tube display (CRT), a liquid crystal display (LCD), a plasma display panel (PDP), a field emission display (FED), or an organic EL display, a touch panel of a domestic electrical appliance, etc., an automotive part, a show window, window glass, etc.

Synthetic examples of the polymers of the present invention are shown below, but the present invention is in no way limited thereby.

Synthetic Example 1

Synthesis of Compound Example K-1

275 ml of methyl ethyl ketone (MEK) was stirred under a flow of nitrogen at 60° C. for 1 hour, and a solution of 0.5 g of polymerization initiator V-65 (manufactured by Wako Pure Chemical Industries, Ltd.) in 8.3 ml of MEK was added as one portion. Subsequently, glycidyl methacrylate (50 g) was added dropwise over 2 hours to the mixture, after completion of the dropwise addition a solution of V-65 (0.5 g) in MEK (8.3 ml) was added to the mixture, and the mixture was reacted for 2 hours. The reaction was then carried out at 80° C. for 2 hours, and after completion of the reaction the mixture was cooled to room temperature. The reaction mixture so obtained was added dropwise to 10 L of hexane over 1 hour, and the precipitate so obtained was dried under vacuum at 35° C. for 8 hours to give 45 g of K-1.

Synthetic Example 2   Synthesis of Compound Example P-1

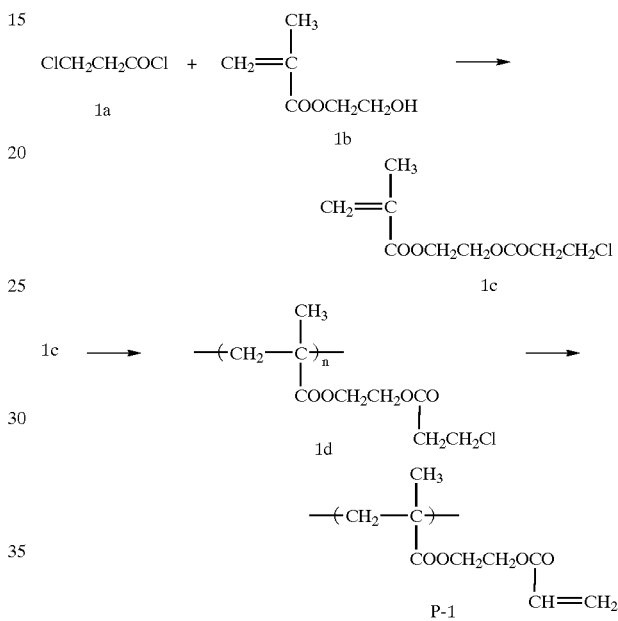

1b (3.0 mol) was dissolved in 1400 ml of tetrahydrofuran (THF), and the reaction vessel was cooled to 5° C. 1a (3.15 mol) was added dropwise to the solution over 1 hour, and the mixture was then reacted for 6 hours. The reaction mixture so obtained was concentrated under vacuum at 30° C., 0.3 g of 1,1-diphenyl-2-picrylhydrazyl free radical was added as a polymerization inhibitor, and the mixture was subjected to vacuum distillation. The fraction distilling at 118° C. to 121° C. at a vacuum pressure of 133 Pa was collected and purified by silica gel column chromatography (eluent: acetone/hexane=5/95 (ratio by volume)) to give 362 g of 1c.

Next, 275 ml of methyl ethyl ketone (MEK) was stirred under a flow of nitrogen at 60° C. for 1 hour, and a solution of 0.5 g of polymerization initiator V-65 (manufactured by Wako Pure Chemical Industries, Ltd.) in 8.3 ml of MEK was added as one portion. Subsequently, 1c (50 g) was added dropwise over 2 hours to the mixture, after completion of the dropwise addition a solution of V-65 (0.5 g) in MEK (8.3 ml) was added to the mixture, and the mixture was reacted for 2 hours. The reaction was then carried out at 80° C. for 2 hours, and after completion of the reaction the mixture was cooled to room temperature. The reaction mixture so obtained was added dropwise to 10 L of hexane over 1 hour, and the precipitate so obtained was dried under vacuum at 35° C. for 8 hours to give 43 g of 1d.

Next, 1d (43 g) was dissolved in acetone (390 ml) and the solution was cooled to 5° C. Triethylamine (390 mmol) was added dropwise to the solution over 1 hour, and after completion of the dropwise addition the mixture was reacted at room temperature for 24 hours. The reaction vessel was then cooled to 5° C., 29.3 ml of a 6N aqueous solution of hydrochloric acid was added dropwise over 1 hour, and after completion of the dropwise addition the mixture was stirred for 1 hour. Ethyl acetate (1 L) and a 10 wt % aqueous solution (1 L) of sodium chloride were added to the reaction mixture so obtained and stirred, and the aqueous layer was then separated. The organic layer was washed twice with a 10 wt % aqueous solution (1 L) of sodium chloride, 100 g of sodium sulfate was added to the organic layer, it was dried for 1 hour, and the sodium sulfate was then filtered off. The solution so obtained was concentrated to 500 ml, which was then added dropwise to 10 L of hexane over 1 hour, and the precipitate so obtained was dried under vacuum at 20° C. for 8 hours to give 33 g of Compound Example P-1.

Synthetic Example 3

Synthesis of Compound Example P-19

30 g of polyvinyl alcohol (PVA-105: degree of saponification 98.5%; manufactured by Kuraray Co., Ltd.) was dissolved in 1000 ml of dimethyl sulfoxide, pyridine (200 ml) and nitrobenzene (10 ml) were added to the solution, and the mixture was cooled to 10° C. 100 ml of acrylic anhydride was then added dropwise thereto over 1 hour, and after completion of the dropwise addition the mixture was reacted at room temperature for 24 hours. The reaction mixture so obtained was added dropwise to 20 L of water over 1 hour, the precipitate so obtained was dissolved in 1 L of ethyl acetate, and the solution was washed twice with a 2N aqueous solution (1 L) of hydrochloric acid. The solution was further washed twice with a 10 wt % aqueous solution (1 L) of sodium chloride, 100 g of sodium sulfate was added, the solution was dried for 1 hour, and the sodium sulfate was then filtered off. The solution so obtained was concentrated to 500 ml, which was added dropwise to 10 L of hexane over 1 hour, and the precipitate so obtained was dried under vacuum at 20° C. for 8 hours to give 28 g of Compound Example P-19.

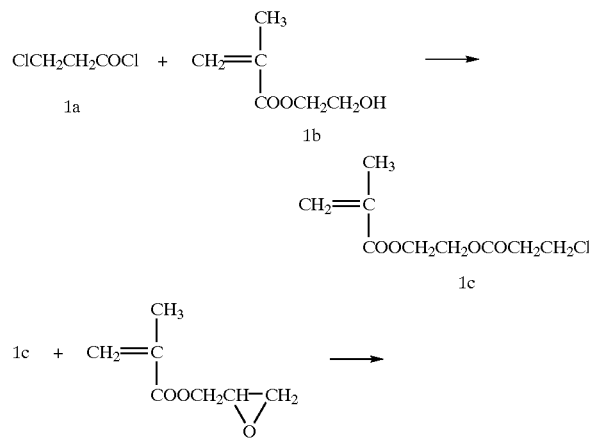

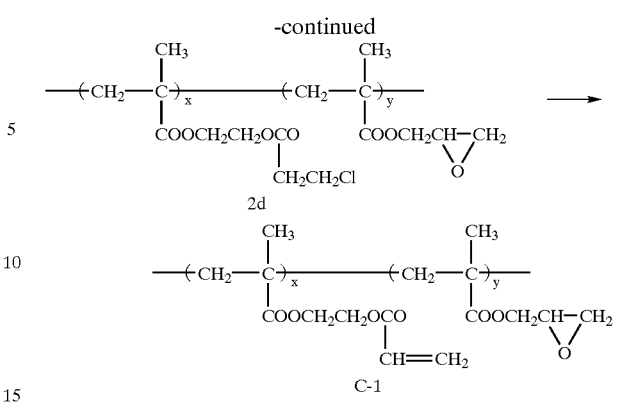

1b (3.0 mol) was dissolved in 1400 ml of tetrahydrofuran (THF), and the reaction vessel was cooled to 5° C. 1a (3.15 mol) was added dropwise to the solution over 1 hour, and the mixture was then reacted for 6 hours. The reaction mixture so obtained was concentrated under vacuum at 30° C., 0.3 g of 1,1-diphenyl-2-picrylhydrazyl free radical was added as a polymerization inhibitor, and the mixture was subjected to vacuum distillation. The fraction distilling at 118° C. to 121° C. at a vacuum pressure of 133 Pa was collected and purified by silica gel column chromatography (eluent: acetone/hexane=5/95 (ratio by volume)) to give 362 g of 1c.

Next, 275 ml of methyl ethyl ketone (MEK) was stirred under a flow of nitrogen at 60° C. for 1 hour, and it was then mixed with a solution of 0.5 g of polymerization initiator V-65 (manufactured by Wako Pure Chemical Industries, Ltd.) in 8.3 ml of MEK. 1c (41.9 g) and glycidyl methacrylate (15.0 g) were then added dropwise to the mixture over 2 hours, after completion of the dropwise addition a solution of V-65 (0.5 g) in MEK (8.3 ml) was added to the mixture, and the mixture was reacted for 2 hours. The reaction was then carried out at 80° C. for 2 hours, and after completion of the reaction the mixture was cooled to room temperature. The reaction mixture so obtained was added dropwise to 10 L of hexane over 1 hour, and the precipitate so obtained was dried under vacuum at 35° C. for 8 hours to give 49 g of 2d.

Next, 2d (49 g) was dissolved in acetone (390 ml) and the solution was cooled to 5° C. Triethylamine (390 mmol) was added dropwise to the solution over 1 hour, and after completion of the dropwise addition, the mixture was reacted at room temperature for 24 hours. The reaction vessel was then cooled to 5° C., 29.3 ml of a 6N aqueous solution of hydrochloric acid was added dropwise over 1 hour, and after completion of the dropwise addition, the mixture was stirred for 1 hour. Ethyl acetate (1 L) and a 10 wt % aqueous solution (1 L) of sodium chloride were added to the reaction mixture so obtained and stirred, and the aqueous layer was then separated. The organic layer was washed twice with a 10 wt % aqueous solution (1 L) of sodium chloride, 100 g of sodium sulfate was added, the layer was dried for 1 hour, and the sodium sulfate was then filtered off. The solution so obtained was concentrated to 500 ml, which was then added dropwise to 10 L of hexane over 1 hour, and the precipitate so obtained was dried under vacuum at 20° C. for 8 hours to give 36 g of Compound Example C-1 (x/y=70/30 wt %).

The present invention is explained in more detail below by reference to examples, but the present invention is in no way limited thereby

EXAMPLES

Preparation of Dispersion of Inorganic Cross-linked Fine Particles

Each of the reagents below was metered into a ceramic-coated vessel.

| | |
|---|---|
| Methyl isobutyl ketone | 234 g |
| Anionic functional group-containing surface-modifying agent S-6 (X = H) | 36 g |
| Alumina fine particles (average particle size: 15 nm) | 180 g |

The above-mentioned liquid mixture was finely dispersed in a sand mill (1/4G sand mill) at 1600 rpm for 10 hours. The medium was 1400 g of 1 mmφ zirconia beads. After the dispersion, the beads were separated to give a dispersion of surface-modified inorganic cross-linked fine particles.

Preparation of Curable Composition

The cross-linkable polymer of the present invention (1), a compound having an ethylenically unsaturated group (2), a compound having a group capable of ring-opening polymerization (3), a radical polymerization initiator (Irgacure 184; manufactured by Ciba-Geigy Ltd.) (4), and a cationic polymerization initiator (UVI-6990; manufactured by Union Carbide Japan K.K.) (5) were dissolved in methyl ethyl ketone, organic cross-linked fine particles (6) were then added thereto and the mixture was stirred for 30 minutes, the dispersion of inorganic cross-linked fine particles (7) was added thereto, and the mixture was stirred for 30 minutes to give a curable composition. The types of cross-linkable polymer of the present invention (1), compound having an ethylenically unsaturated group (2), and compound having a group capable of ring-opening polymerization (3) were chosen in the combinations shown in Table 5, and the mixing ratios of (1), (2), (3) and the cross-linked fine particles were adjusted as shown in Table 5. Among the cross-linkable polymers of the present invention, the polymers having both an ethylenically unsaturated group and a group capable of ring-opening polymerization are listed in the section 'copolymer of the present invention', polymers having only a group capable of ring-opening polymerization are listed in the section 'compounds containing group capable of ring-opening polymerization', and polymers having only an ethylenically unsaturated group are listed in the section 'compounds containing ethylenically unsaturated group'.

With regard to the polymerization initiators, the radical polymerization initiator and the cationic polymerization initiator were each added at 2.9% based on the total weight, including the cross-linkable polymer of the present invention, of the compound having an ethylenically unsaturated group plus the compound having a group capable of ring-opening polymerization. When using no compound having a group capable of ring-opening polymerization, the radical polymerization initiator alone was added at 5.8%.

The organic cross-linked fine particles were obtained by drying a latex (average particle size: 110 nm) having a core/shell ratio of 70/30 wt % by a spray dry method, and were used without further treatment (core: copolymer of butyl acrylate/ethylene glycol dimethacrylate (90/10 ratio by weight), shell: copolymer of methyl methacrylate/acrylic acid/ethylene glycol dimethacrylate (90/3/7 ratio by weight)).

DPHA: mixture of dipentaerythritol pentaacrylate/ dipentaerythritol hexaacrylate (manufactured by Nippon Kayaku Co., Ltd.)
DPPA: dipentaerythritol monohydroxy pentaacrylate
UV-6300: urethane acrylate (manufactured by The Nippon Synthetic Chemical Industry Co., Ltd.)
DTPTA: di-trimethylolpropane tetraacrylate (manufactured by Aldrich Inc.)
PETA: pentaerythritol triacrylate (manufactured by Aldrich Inc.)
PETTA: pentaerythritol tetraacrylate (manufactured by Aldrich Inc.)
ECMECC: 3,4-epoxycyclohexylmethyl-3,4-epoxycyclohexanecarboxylate (manufactured by Aldrich Inc.)
CHDMDV: 1,4-cyclohexanedimethanol divinyl ether (manufactured by Aldrich Inc.)
GT-401: tetrafunctional epoxy compound (manufactured by Daicel Chemical Industries, Ltd.)
TMPTA: trimethylolpropane triacrylate (manufactured by Aldrich Inc.)
BADGE: bisphenol A diglycidyl ether
TMPTGE: trimethylolpropane triglycidyl ether

TABLE 5

| | | Compounds containing cross-linkable group (mixing ratio: wt %) | | | | | |
|---|---|---|---|---|---|---|---|
| No. | Layer structure | Copolymer of the pres. invention | Compounds containing ethylenically unsaturated group | | | Compounds containing group capable of ring-opening polymerization | |
| 101 | Single | None | DPHA(80) | UV-6300(20) | | None | |
| 102 | Single | None | DPHA(65) | UV-6300(35) | | None | |
| 103 | Single | None | TMPTA(40) | UV-6300(60) | | None | |
| 104 | Two-upper | None | DTPTA(60) | PETA(40) | | None | |
| | and lower | None | DTPTA(24) | PETA(16) | CHDMDV(6) | ECMECC(54) | |
| 105 | Two-upper | None | DTPTA(60) | PETA(40) | | None | |
| | and lower | None | DTPTA(24) | PETA(16) | CHDMDV(6) | ECMECC(54) | |
| 106 | Single | None | DPPA(70) | | | BADGE(30) | |
| 107 | Single | None | PETTA(70) | | | TMPTGE(30) | |
| 108 | Single | None | DPPA(70) | | | BADGE(30) | |
| 109 | Single | None | PETTA(70) | | | TMPTGE(30) | |
| 110 | Single | None | DPHA(70) | | | K-1(30) | |
| 111 | Single | None | TMPTA(75) | | | K-1(25) | |
| 112 | Single | None | DPHA(45) | P-1(20) | | K-3(35) | |
| 113 | Single | None | DPHA(65) | | | K-1(35) | |
| 114 | Single | None | DPHA(65) | | | K-32(35) | |
| 115 | Single | None | DPHA(70) | | | K-30(30) | |
| 116 | Single | None | DPHA(25) | P-1(25) | | K-21(30) | K-30(20) |
| 117 | Single | None | DTPTA(60) | | | K-35(30) | GT-401(10) |
| 118 | Single | None | DPHA(20) | P-1(50) | | K-11(30) | |
| 119 | Single | None | TMPTA(40) | UV-6300(30) | | K-22(30) | |

TABLE 5-continued

| | | | | | | |
|---|---|---|---|---|---|---|
| 120 | Single | None | DPHA(50) | UV-6300(20) | K-13(30) | |
| 121 | Single | None | DPHA(55) | | K-7(35) | ECMECC(10) |
| 122 | Two-upper | None | DTPTA(70) | | K-3(30) | |
| | and lower | None | DPHA(65) | | K-1(35) | |
| 123 | Single | C-1(100) | None | | None | |
| 124 | Single | C-7(80) | DPHA(20) | | None | |
| 125 | Single | C-11(100) | None | | None | |
| 126 | Single | C-12(90) | P-1(10) | | None | |
| 127 | Single | C-12(85) | None | | K-1(15) | |
| 128 | Single | C-1(100) | None | | None | |
| 129 | Single | C-5(100) | None | | None | |
| 130 | Two-upper | C-1(100) | None | | None | |
| | and lower | C-3(100) | None | | None | |
| 131 | Single | None | DPHA(65) | UV-6300(35) | None | |
| 132 | Single | None | DPHA(70) | | K-1(30) | |
| 133 | Single | C-1(100) | None | | None | |

101–109, 131 Comparative Examples
110–130, 132, 133 The present invention

| No. | Inorg. cross-linked particle content (Vol %) | Org. cross-linked particle content (Vol %) | Cured coating thickness (μm) | Pencil scratch hardness 4H | 5H | 6H | 8H | Coating peel-off (squares peeled off) | Curl (mm) | Cracks Surface (mm) | Edge |
|---|---|---|---|---|---|---|---|---|---|---|---|
| 101 | 12.8 | None | 11 | 1 | 0 | 0 | | 8 | 12 | 40 | B |
| 102 | 12.8 | 10 | 24 | 4 | 0 | 0 | | 10 | 21 | 55 | B |
| 103 | 12.8 | 20 | 53 | 5 | 4 | 1 | | 14 | 26 | 58 | B |
| 104 | None | None | 6 | 2 | 0 | 0 | | 0 | 6 | ≦30 | B |
| | None | None | 7 | | | | | | | | |
| 105 | None | None | 21 | 4 | 2 | 0 | | 0 | 15 | 50 | B |
| | None | None | 25 | | | | | | | | |
| 106 | None | None | 5 | 0 | 0 | 0 | | 0 | 3 | ≦30 | A |
| 107 | None | None | 6 | 0 | 0 | 0 | | 0 | 3 | ≦30 | A |
| 108 | None | None | 45 | 3 | 1 | 0 | | 0 | 15 | 65 | A |
| 109 | None | None | 50 | 3 | 1 | 0 | | 0 | 17 | 58 | A |
| 110 | None | None | 45 | 5 | 5 | 1 | | 0 | ≦1 | ≦30 | A |
| 111 | None | None | 53 | 5 | 4 | 1 | | 0 | ≦1 | ≦30 | A |
| 112 | None | None | 64 | 5 | 5 | 2 | | 0 | ≦1 | ≦30 | A |
| 113 | 12.8 | None | 17 | 5 | 0 | 0 | | 0 | ≦1 | ≦30 | A |
| 114 | None | None | 28 | 5 | 1 | 0 | | 0 | ≦1 | ≦30 | A |
| 115 | None | None | 39 | 5 | 3 | 0 | | 0 | ≦1 | ≦30 | A |
| 116 | None | None | 51 | 5 | 4 | 1 | | 0 | ≦1 | ≦30 | A |
| 117 | None | None | 68 | 5 | 5 | 3 | | 0 | ≦1 | ≦30 | A |
| 118 | 10 | 20 | 80 | 5 | 5 | 4 | | 0 | ≦1 | ≦30 | A |
| 119 | 10 | None | 43 | 5 | 4 | 0 | | 0 | ≦1 | ≦30 | A |
| 120 | None | 10 | 40 | 5 | 5 | 0 | | 0 | ≦1 | ≦30 | A |
| 121 | None | None | 49 | 5 | 5 | 1 | | 0 | ≦1 | ≦30 | A |
| 122 | None | None | 20 | 5 | 5 | 0 | | 0 | ≦1 | ≦30 | A |
| | None | None | 27 | | | | | | | | |
| 123 | None | None | 16 | 5 | 0 | 0 | | 0 | ≦1 | ≦30 | A |
| 124 | None | None | 27 | 5 | 1 | 0 | | 0 | ≦1 | ≦30 | A |
| 125 | None | None | 38 | 5 | 4 | 0 | | 0 | ≦1 | ≦30 | A |
| 126 | None | None | 44 | 5 | 5 | 0 | | 0 | ≦1 | ≦30 | A |
| 127 | None | None | 52 | 5 | 4 | 1 | | 0 | ≦1 | ≦30 | A |
| 128 | 12.8 | 5 | 66 | 5 | 5 | 3 | | 0 | ≦1 | ≦30 | A |
| 129 | 10 | None | 78 | 5 | 5 | 4 | | 0 | ≦1 | ≦30 | A |
| 130 | None | None | 20 | 5 | 5 | 0 | | 0 | ≦1 | ≦30 | A |
| | None | None | 27 | | | | | | | | |
| 131 | 12.8 | 10 | 30 | | | | 4 | 85 | | | |
| 132 | None | None | 29 | | | | 4 | 0 | | | |
| 133 | None | None | 32 | | | | 4 | 0 | | | |

Preparation of Hardcoated Film Samples (Samples 101 to 130)

As a transparent substrate, 188 μm polyethylene terephthalate film was subjected to a glow discharge treatment. The curable compositions prepared above were coated thereon by a slot coater so as to give the coating thicknesses described in Table 5, dried at 120° C. for 2 minutes, irradiated with 750 mj/cm$^2$ of UV rays, and then heated at 120° C. for 10 minutes to give hardcoated film samples. In Samples 104, 105, 122 and 130, after a lower layer was formed by coating and cured, an upper layer was formed by coating and cured, and the evaluations below were performed after the upper layer was formed by coating and cured.

Sample 104: Combination of curable composition and layer structure described in JP-A-2000-71392 Example 1.

Sample 106: Combination of curable composition described in JP-A-8-73771 Example 10.

Sample 107: Combination of curable composition described in JP-A-8-73771 Example 12.

Preparation of Hardcoated Glass Samples (Samples 131 to 133)

As a transparent substrate, curved surface glass (a front face board of a curved surface CRT) was subjected to a surface treatment with a silane coupling agent (methacryloyloxypropyl trimethoxysilane). The curable compositions prepared above were spray-coated thereon so as to give the coating thicknesses described in Table 5, dried at 120° C. for 2 minutes, irradiated with 750 mj/cm² of UV rays, and then heated at 120° C. for 10 minutes to give hardcoated glass samples.

The samples were evaluated by the methods below.

Method of Evaluation of Pencil Hardness

The hardcoated film and hardcoated glass samples so prepared were conditioned at 25° C. and 60% RH for 2 hours. The samples were scratched five times using each hardness of test pencil specified in JIS S6006 with a 1 kg weight by the pencil hardness evaluation method specified in JIS K5400, and the number of times of scratching for which no damage was observed was recorded. The damage defined by JIS K5400 includes (1) a rip in the coating and (2) abrasion of the coating, and excludes (3) a dent in the coating, but in this evaluation (3) a dent in the coating was included in the damage.

Method of Evaluation of Coating Peel-off

The surface of the hardcoat layer of the hardcoated film and hardcoated glass samples was scored using a cutter to give a crosshatch pattern of 100 squares having a size of 1 mm×1 mm and allowed to stand at 25° C. and 60% RH for 2 hours. Subsequently, cellotape (Trademark, manufactured by Nichiban Co., Ltd.) was stuck thereto, and the number of the cured coating squares that peeled off from the film substrate when the cellotape was peeled off was counted.

Method of Evaluation of Curl

The hardcoated film sample was cut into a 35 mm×140 mm piece, conditioned on a horizontal surface at 25° C. and 60% RH for 2 hours with the hardcoat layer facing upward, the extent to which each of the four corners had risen from the horizontal surface was measured, and the average was obtained.

Method of Evaluation of Cracking

The hardcoated film sample was cut into a 35 mm×140 mm piece, and conditioned at 25° C. and 60% RH for 2 hours. Subsequently, the sample was rolled into a tube, the diameter of curvature at which cracking started to occur was measured, and cracking on the surface was thus evaluated. Cracking on the edges was examined visually and evaluated as follows; A for no cracking, B for any cracking, however small.

Preparation of Coating Solution for High Refractive Index Layer 30.0 parts by weight of titanium dioxide fine particles (TTO-55B, manufactured by Ishihara Sangyo Kaisha, Ltd.), 4.5 parts by weight of a carboxylic acid group-containing monomer (Aronix M-5300, manufactured by Toagosei Co., Ltd.), and 65.5 parts by weight of cyclohexanone were dispersed using a sand grinder mill to give a dispersion of titanium dioxide having a weight-average diameter of 55 nm. To this dispersion of titanium dioxide were added dipentaerythritol hexaacrylate (DPHA, manufactured by Nippon Kayaku Co., Ltd.) and a radical photopolymerization initiator (Iragure 184, manufactured by Ciba-Geigy Ltd.; added at 5% of the total amount of monomers (dipentaerythritol hexaacrylate, anionic monomer, and cationic monomer)) so as to give a high refractive index layer having a refractive index of 1.85.

Preparation of Coating Solution for Low Refractive Index Layer 30.0 parts by weight of silicon dioxide fine particles (Aerosil 200, manufactured by Nippon Aerosil Co., Ltd.), 4.5 parts by weight of a carboxylic acid group-containing monomer (Aronix M-5300, manufactured by Toagosei Co., Ltd.), and 65.5 parts by weight of cyclohexanone were dispersed using a sand grinder mill to give a dispersion of silicon dioxide having a weight-average diameter of 12 nm. To this dispersion of silicon dioxide were added 60 parts by weight of pentaerythritol tetraacrylate (PETA, manufactured by Nippon Kayaku Co., Ltd.), 2 parts by weight of a radical photopolymerization initiator (Iragure 184, manufactured by Ciba-Geigy Corp.), 9 parts by weight of Megafac 531A ($C_8F_{17}SO_2N(C_3H_7)CH_2CH_2OCOCH=CH_2$, manufactured by Dainippon Ink & Chemicals Inc.), and methyl ethyl ketone, and the mixture was stirred to give a coating solution for a low refractive index layer. The amount of the dispersion of silicon dioxide fine particles added was adjusted so that the low refractive index layer had a refractive index of 1.50.

Preparation of Antireflection Layer-containing Hardcoated Film and Hardcoated Glass Samples The coating solution for a high refractive index layer prepared above was coated using a bar coater on the hardcoated film samples 101 to 130 and spray-coated hardcoated glass samples 131 to 133, dried at 120° C. for 1 minutes and then cured by irradiation with 350 mj/cm² UV rays to give a high refractive index layer having a thickness of 75 nm. The coating solution for a low refractive index layer prepared above was coated using a bar coater or spray-coated on top of each of the high refractive index layers thus obtained, dried at 12° C. for 1 minute and then cured by irradiation with 350 mj/cm² UV rays to give a low refractive index layer having a thickness of 90 nm. The average reflectance of the specular reflection at an incident angle of 5° was measured in the wavelength range of 450 to 650 nm using a spectrophotometer (manufactured by Jasco Corp.), and it was found to be 1.0% to 1.2% for all of the samples having an antireflection layer, suggesting that they had good antireflection performance.

Image Display Device Equipped with a Film Having an Antireflection Hardcoat Layer An acrylic adhesive was applied to a surface of the hardcoated film samples 101–130 having an antireflection layer prepared above, the surface being free of the hardcoat layer, and the film sample was laminated respectively on a PDP(42-inch plasma display(CMP4121 HDJ) manufactured by Hitachi, Ltd.), a CRT(28-inch flat television(TH-28FP20) manufactured by Matushita Electric Industrial Co., Ltd.), a LCD(15-inch TFT liquid crystal monitor(RDT151A) manufactured by Mitsubishi Electric Corporation) and a touch panel (Zaurus(MI-L1) manufactured by Sharp Corporation). The reflection of external light (glare of a fluorescent lamp) was evaluated visually, and it was found that all of the hardcoated films having an antireflection layer suppressed the glare from the image display devices on which they were laminated, and gave good image viewability (apart from antireflection layer-containing hardcoated film samples 101, 102, 103, 105, 108 and 109; these curled to a large extent and could not be laminated on any image display device, and evaluation of the reflection of external light was therefore not carried out).

It was found from the results given in Table 5 that Comparative Sample 131 in which glass was used as a substrate had excellent pencil hardness but was poor in terms of coating peel-off, whereas Samples 132 and 133 of the present invention had excellent pencil hardness and showed no coating peel-off. Comparative Samples 101 to 103 in which a plastic film was used as the substrate had excellent pencil hardness when the coating thickness was increased, but they were poor in terms of coating peel-off, curling and cracking. Comparative Samples 104 and 105 had improved properties in terms of coating peel-off and curling, but not in terms of cracking. Comparative Samples 106 to 109 achieved some degree of pencil hardness by increasing the coating thickness, but the curling and cracking on the surface were adversely affected. Samples 110 to 130 of the present invention had greatly improved pencil hardness, showed almost no coating peel-off and curling, and had greatly improved properties in terms of cracking. Furthermore, when a hardcoated film in which an antireflection layer was formed on the hardcoat layer was laminated on an image display device, Comparative Samples 101, 102, 103, 105, 108 and 109 curled to a great extent and could not be laminated. However, the antireflection layer-containing hardcoated film samples 110 to 130 of the present invention had a low refractive index and could be laminated on an image display device since they curled very little, and the image display devices on which they were laminated had little external light glare and exhibited excellent viewability.

What is claimed is:

1. A hardcoated article comprising:

a hardcoat layer formed by curing a curable composition by polymerizing both a group capable of ring-opening polymerization and an ethylenically unsaturated group, wherein the group capable of ring-opening polymerization is polymerized via ring-opening polymerization, the curable composition comprising:

a cross-linkable polymer comprising a repeating unit represented by formula (1) below, the group capable of ring-opening polymerization being present in a side chain of the polymer,

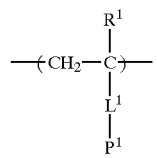

Formula (1)

wherein in the formula (1), $R^1$ denotes hydrogen or an alkyl group having 1 to 4 carbon atoms, $P^1$ is a monovalent group containing a group capable of ring-opening polymerization, and $L^1$ is a single bond or a divalent linking group, wherein
   (a) the curable composition further comprises a compound containing at least two ethylenically unsaturated groups, or
   (b) the cross-linkable polymer comprising a repeating unit represented by formula (1) further comprises a repeating unit represented by formula (2),

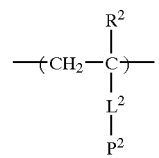

Formula (2)

wherein in the formula (2), $R^2$ denotes hydrogen or an alkyl group having 1 to 4 carbon atoms, $P^2$ is a monovalent group containing an ethylenically unsaturated group, and $L^2$ is a single bond or a divalent linking group.

2. The hardcoated article according to claim 1, wherein the curable composition further comprises a compound containing at least two ethylenically unsaturated groups in the molecule.

3. The hardcoated article according to claim 1, wherein the cross-linkable polymer comprising a repeating unit represented by formula (1) further comprises a repeating unit represented by formula (2),

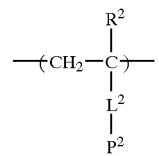

wherein in the formula (2), $R^2$ denotes hydrogen or an alkyl group having 1 to 4 carbon atoms, $P^2$ a monovalent group containing an ethylenically unsaturated group, and $L^2$ is a single bond or a divalent linking group.

4. The hardcoated article according to claim 1, wherein the hardcoat layer is a single hardcoat layer.

5. The hardcoated article according to claim 1, wherein the surface of the hardcoat layer after curing has a pencil hardness of 4H to 9H.

6. A hardcoated film comprising a hardcoated article according to claim 1 employing a plastic film as a substrate.

7. The hardcoated article according to claim 1, wherein the hardcoat layer after curing has a coating thickness of 20 to 200 $\mu$m.

8. The hardcoated article according to claim 1, further comprising an antireflection layer on top of the hardcoat layer.

9. A hardcoated article according to claim 1, wherein the hardcoat layer is formed by coating the curable composition on a substrate, followed by curing the curable composition.

* * * * *